(12) United States Patent
Saxena et al.

(10) Patent No.: US 6,377,928 B1
(45) Date of Patent: Apr. 23, 2002

(54) VOICE RECOGNITION FOR ANIMATED AGENT-BASED NAVIGATION

(75) Inventors: Parichay Saxena, Milpitas; Sheng Dong, Fremont; Alexandra Nsonwu, San Jose, all of CA (US)

(73) Assignees: Sony Corporation (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/283,385

(22) Filed: Mar. 31, 1999

(51) Int. Cl.$^7$ ............................................. G10L 13/00
(52) U.S. Cl. ..................... 704/275; 704/270; 707/513
(58) Field of Search ................... 704/270, 275; 707/501, 513; 345/357

(56) References Cited

U.S. PATENT DOCUMENTS

| | | | | |
|---|---|---|---|---|
| 5,745,754 A | * | 4/1998 | Lagarde et al. | 395/615 |
| 5,752,246 A | * | 5/1998 | Rogers et al. | 707/10 |
| 5,893,127 A | * | 4/1999 | Tyan et al. | 707/513 |
| 5,893,916 A | * | 4/1999 | Dooley | 707/523 |
| 5,915,001 A | * | 6/1999 | Uppaluru | 379/88.22 |
| 5,953,392 A | * | 9/1999 | Rhie et al. | 379/88.13 |
| 6,029,135 A | * | 2/2000 | Krasle | 704/275 |
| 6,167,409 A | * | 12/2000 | DeRose et al. | 707/513 |
| 6,211,878 B1 | * | 4/2001 | Cheng et al. | 345/357 |

OTHER PUBLICATIONS

"New talking browser allows blind to use Net," Dow Jones News Service, San Jose Mercury News, Mar. 8, 1998, p. 1.
"New Motorola technology offers voice commends for the Internet," CNBC & The Wall Street Journal. Commence WSI.Com Hightlights, web pp. 1–3.
Joseph J. Lazzaro, "Helping the Web help the disabled," IEEE Spectrum, Mar. 1999, pp. 54–59.
"Microsoft Agent Documentation," Microsoft Corporation, Oct. 1998, web pp. 1–3.
"Microsoft Agent User Interface," Microsoft Corporation, Oct. 1998, web pp. 1–9.

* cited by examiner

Primary Examiner—Richemond Dorvil
Assistant Examiner—Susan McFadden
(74) Attorney, Agent, or Firm—Skjerven Morrill MacPherson LLP; David W. Heid

(57) ABSTRACT

A method of operation of a computer system for processing an arbitrary document such as a World Wide Web page to provide additional information not immediately available from the raw, unprocessed document. This additional information allows a user to navigate and control the content of the document using, in some embodiments, voice commands and/or an agent-based user interface. The present disclosure provides both a visual display of previously invisible links embedded in a web page image and an audible indication of the presence of such links. The present invention further comprises a scripting language that allows the rapid creation of executable computer instructions (or scripts) for controlling the behaviors and functionality of the agent-based interface. Such scripts enable the creation of a friendlier, easy to use interface to the navigation and control features. The present invention also comprises the ability to read the contents of an arbitrary web page aloud, including the names of embedded hypertext links, thus facilitating web surfing by the sightless.

27 Claims, 13 Drawing Sheets

```
<map name="oval">
<area shape="polygon" alt="Products" coords="27, 0, 27, 18, 91, 48, 106,
41, 122, 15, 88, 2, 27, 0, 27, 0, 27, 0, 27, 0, 27, 0, 27, 0, 27, 0" href="/products
/" onMouseOver="imgAct ('oval1') " onMouseOut="imgInact('oval1') ">
<area shape="polygon" alt="Support" coords="108, 41, 122, 16, 192, 59, 1
91, 100, 109, 56, 108, 41, 108, 41" href="/support/" onMouseOver="imgAct (
'oval2') " onMouseOut="imgInact ('oval2') ">
<area shape="polygon" alt="Community" coords="84, 51, 17, 20, 7, 50, 56,
104, 85, 52, 85, 50, 85, 50" href="/community/" onMouseOver="imgAct ('ova
l3') " onMouseOut="imgInact ('oval3') ">
<area shape="polygon" alt="Technology" coords="109, 64, 86, 67, 63, 106
, 139, 138, 184, 128, 184, 105" href="/technology/" onMouseOver="imgAct (
'oval4') " onMouseOut="imgInact ('oval4') ">
<area shape="default" nohref>
</map>
```

FIG. 8
(PRIOR ART)

```
                                                              ~1000
6 .gif" NAME="toproll" WIDTH=600 HEIGHT=115 BORDER=0></A>
                                                      </TD>
                                                    </TR>
                                          <TR>
                                             <TD WIDTH=100 ALIGN=RIGHT>
                                             <IMG SRC="images/spacer.gi
f" BORDER="0" WIDTH="100" HEIGHT="32" HSPACE="0" VSPACE="0">
                                                      </TD>
<!-- ....................... END BDGD PROMO CELLS ..............
........ -->

<!-- ....................... ANIMATION HEADERS..................
.-->
                                             <TD WIDTH=91 ALIGN=RIGHT>
                                             <A HREF="/goto-sme" onmous
 eover="display(1) " onmouseout="display(0) " TARGET="_top">
                                             <IMG SRC="images/m1_0216.g
 if" BORDER=0 WIDTH=64 HEIGHT=32 HSPACE=0 VSPACE=0 ALT="Sony Music"
 ></A>
                  ⎵                                   ⎵            810
                 1010                                </TD>
                                             <TD WIDTH=105 ALIGN=RIGHT>
                                             <A HREF="/goto-spe" onmous
 eover="display(2) " onmouseout="display(0) " TARGET="_top">
                                             <IMG SRC="images/mt1_0216.
 gif" BORDER=0 WIDTH=100 HEIGHT=32 HSPACE=0 VSPACE=0 ALT="Sony Movi
 es & TV Shows"></A>
                                                      </TD>
                                             <TD WIDTH=105 ALIGN=RIGHT>
                                             <A HREF="/goto-sel" onmous
 eover="display(3) " onmouseout="display(0) " TARGET="_top">
                                             <IMG SRC="images/e1_0216.g
 if" BORDER=0 WIDTH=92 HEIGHT=32 HSPACE=0 VSPACE=0 ALT="Sony Electr
 onics"></A>
                                                      </TD>
                                             <TD WIDTH=105 ALIGN=RIGHT>
                                             <A HREF="/goto-scea" onmou
 seover="display(4) " onmouseout="display(0) " TARGET="_top">
                                             <IMG SRC="images/P1_0216.g
 if" BORDER=0 WIDTH=87 HEIGHT=32 HSPACE=0 VSPACE=0 ALT="Sony PlaySt
 ation"></A>
```

FIG. 10
(PRIOR ART)

```
                                      <IMG SRC="images/roll1_021
6 .gif" NAME="toproll" WIDTH=600 HEIGHT=115 BORDER=0><br>Picture 0<
/A>
                                      </TD>
                                      </TR>
                              <TR>
                                      <TD WIDTH=100 ALIGN=RIGHT>
                                      <IMG SRC="images/spacer.gi
f" BORDER="0" WIDTH="100" HEIGHT="32" HSPACE="0" VSPACE="0">
                                      </TD>
<!-- .......................END BDGD PROMO CELLS............
......-->

<!-- ..........................ANIMATION HEADERS...................
.-->
                                      <TD WIDTH=91 ALIGN=RIGHT>
                                      <A HREF="/goto-sme" onmous
eover="display(1) " onmouseout="display(0) " TARGET="_top">
                                      <IMG SRC="images/m1_0216.g
if" BORDER=0 WIDTH=64 HEIGHT=32 HSPACE=0 VSPACE=0 ALT="Sony Music"
><br>Sony Music</A>
                                                </TD>
                                      <TD WIDTH=105 ALIGN=RIGHT>
                                      <A HREF="/goto-spe" onmous
eover="display(2) " onmouseout="display(0) " TARGET="_top">
                                      <IMG SRC="images/mt1_0216.
gif" BORDER=0 WIDTH=100 HEIGHT=32 HSPACE=0 VSPACE=0 ALT="Sony Movi
es & TV Shows"><br>Sony Movies & TV Shows</A>
                                      </TD>
                                      <TD WIDTH=105 ALIGN=RIGHT>
                                      <A HREF="/goto-sel" onmous
eover="display(3) " onmouseout="display(0) " TARGET="_top">
                                      <IMG SRC="images/e1_0216.g
if" BORDER=0 WIDTH=92 HEIGHT=32 HSPACE=0 VSPACE=0 ALT="Sony Electr
onics"><br>Sony Electronics</A>
                                      </TD>
                                      <TD WIDTH=105 ALIGN=RIGHT>
                                      <A HREF="/goto-scea" onmou
seover="display(4) " onmouseout="display(0) " TARGET="_top">
                                      <IMG SRC="images/P1_0216.g
```

FIG. 12

VOICE RECOGNITION FOR ANIMATED AGENT-BASED NAVIGATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to user interfaces for computer systems and more particularly to voice activated, agent-based user interface systems.

2. Description of the Related Art

Computer systems are routinely used to interface with the content of various computer-realized documents, i.e., documents stored in or displayed on those systems. Such systems are often difficult to use, requiring extensive training and user experience before one can enjoy anything approximating ease of use. Historically, interfaces have required user input in the form of typing at a keyboard or pointing and clicking using a mouse or similar pointing device. Recently, software agents, i.e., software programs that present a more accessible, easy to operate interface to the user, have become available. Software agents are executable programs that interface with other programs and with the user. Agents are typically used to provide enhanced user-computer interaction and a more "user friendly" computing experience. Agents generally respond to user commands to invoke other programs or program functions. Agents also translate user input into the form required by other programs. Smart agents, in particular, are agents that are capable of making decisions based on a pattern of user inputs, rather than basing their decisions on explicit user commands.

Agents are more fully described in Fah-chun Cheong, *Internet Agents* (1996) (hereinafter Cheong), incorporated herein in its entirety by reference. Additional information may be found in "ActiveX™ Technology for Interactive Software Agents" furnished as Appendix B to this disclosure. Additional documentation on the Microsoft® ActiveX Technology may be found on the Internet at:

www.Microsoft.com/workshop/imedia/agent/documentation.asp

Such agents are typically implemented in software to run on user command. User input comes from a keyboard or a pointing device, such as a mouse or trackball well known in the art. Some computer systems can also accept limited voice input, which is then passed as software messages to the agent program. Such systems are referred to as "voice-enabled".

The advantage of agent technology, in theory, is that it enables easy user interface without extensive user skill. It has to date been limited in its application because the agent software must be written with a specific set of potential action choices or commands in mind.

Programming an agent-based application typically requires careful construction of a program architecture, logical flowchart, and highly detailed code modules. Extensive testing and debugging are often necessitated by the complexity of the programming language used. Even the so-called high level languages such as C and C++ require extensive programmer training and a high level of skill in order to successfully program agent behaviors and functionality. The C language is described in "The C Programming Language" by Brian W. Kernighan and Dennis M. Ritchie (Prentice Hall, Englewood Cliffs, N.J. 1988 (2d Ed.)), incorporated herein by reference in its entirety. The C++ language is described in "Programming in C++" by Stephen C. Dewhurst and Kathy T. Stark (Prentice Hall, Englewood Cliffs, N.J. 1989), also incorporated herein by reference in its entirety.

Thus a shortcoming of the current state of the art is the difficulty in programming the software to control the behavior of an agent. In typical systems, detailed programming in a specialized computer language is required, such as C or object oriented variants thereof or even assembly code. Using these programming languages requires a high level of skill and training in the programmer. Intricate and precisely detailed procedures for creating the code, compiling it, and preparing a machine readable version are also required. In order to make an agent-based system more readily useable and adaptable, it is necessary to be able to create control software with a minimal amount of programmer sophistication. Prior art software programming techniques additionally require a great deal of time to produce working, operational executable code from the programmer's typed inputs.

As a further drawback, prior art agents can only execute commands available within the application running the agent; they cannot perform actions such as following a hyperlink that are dynamically created by or embedded in an arbitrary document. This latter shortcoming is becoming especially acute as the popularity of the Internet and the World Wide Web (web) continues to increase. Web pages, written in, for example, Hypertext Markup Language (HTML) or a variant thereof, in particular present dynamic links to other pages and new types of content. HTML is described in Ian S. Graham, "The HTML Sourcebook" (1995), incorporated herein by reference in its entirety.

Prior art agent-based interface technology is unable to deal with the dynamic content of web pages and web links (hyperlinks) embedded in other documents because such interface software is unable to understand the contents of the documents. This has the effect of making web navigation and control substantially more frustrating for the inexperienced user, even with a prior art agent-based interface.

The above shortcomings in the prior art are amplified in the case of sightless or seeing-impaired users. While computer systems exist to read plain text aloud, such systems are ineffective on web pages containing objects other than text. One particularly troublesome non-text object is an image map. An image map typically consists of a graphic image that contains regions that are themselves links to different web pages, rather than explicit links. Image maps may consist of icons alone, photographs, or a mixture of text captions and graphic images. However, image maps are downloaded to the browser client in the form of a single graphic image, rather than computer-readable text. As such, text-to-speech programs are unable to sound (read) them to the user.

What is needed is a method of interfacing with an application on a computer system that is friendly and easy to use. What is also needed is a simple and fast method of customizing the behavior of the user interface, to enable rapid prototyping and development. Furthermore, an interface is needed that provides an audible means for interacting with the content of an arbitrary document, such as a web page. The interface needs to provide the ability to navigate hyperlinks embedded in such documents using the user's voice in addition to standard input means well known in the art.

SUMMARY

Presently disclosed is a method of operation of a computer system for processing a document to provide additional information to a user not immediately available from the raw, unprocessed document. This additional information allows a user to navigate and control the content of an arbitrary computer document such as a World Wide Web page using (in one embodiment) voice commands. In one embodiment of the present invention, an agent-based user interface provides both a visual display of previously invisible links embedded in a web page image and an audible indication of the presence of such links. The present invention also provides the ability, in one embodiment, to read the contents of an arbitrary web page document aloud, including the names of embedded hypertext links, thus facilitating web surfing by the sightless.

Furthermore, the present disclosure includes, in one embodiment, a scripting language that allows the rapid creation of executable computer instructions (scripts) for controlling the behaviors and functionality of an agent-based interface. These scripts can be prepared by one of minimal skill in programming and without reference to complex languages such as C or C++, thereby aiding the creation of a friendlier, easy to use interface to the navigation and control features of the present invention.

BRIEF DESCRIPTION OF THE DRAWINGS

The present invention may be better understood, and its numerous objects, features, and advantages made apparent to those skilled in the art, by referencing the accompanying drawings.

FIG. 8 is a segment of prior art HTML, code defining the image map of FIG. 7.

FIG. 10 is a segment of prior art HTML, code defining the web page of FIG. 9.

FIG. 12 is a segment of the HTML code defining the dynamically modified web page of FIG. 11.

The use of the same reference symbols in different drawings indicates similar or identical items.

DETAILED DESCRIPTION

Introduction

The present disclosure is a method of operating a computer system to process an arbitrary document and provide a navigation and control interface to a user.

In the context of this disclosure, "navigation" refers to the user-directed viewing of or scrolling through a document on a computer. Such documents are those that are stored, manipulated, or displayed with the aid of a computer system and may consist of a wide variety of content, such as text or graphic images. Navigation also includes viewing or playing embedded animation (a sequence of timed and optionally branched frames, each frame composed of one or more static images), audio, or video clips. Furthermore, navigation includes the activation of hypertext links within a document and following those links to a new document. All of the above navigable elements are generally referred to in the art as "content."

The term "control" refers generally to opening, speaking (i.e., causing the computer system to sound or read aloud, using a voice synthesizer or similar means, selected text content of a document) editing, or saving a document and its content, e.g., audio and video clips, text, hypertext, etc. These methods of control, known in the art, are typically provided by application and/or operating system software.

The term "page" or "web page" used in this disclosure refers to more than a single page in long document or a single page as known in the context of the World Wide Web. Rather, "page" includes any screen display of information in any form. Furthermore, although the Internet and in particular the World Wide Web, are described, those skilled in the art will realize that networks other than the Internet or the web can be used. One of ordinary skill in the art will appreciate that intranets, extranets, private LAN/WAN spaces, and generally any form of cyberspace construct may be used. Accordingly, the invention is not limited to documents presented on any particular type of network.

Figure 1:
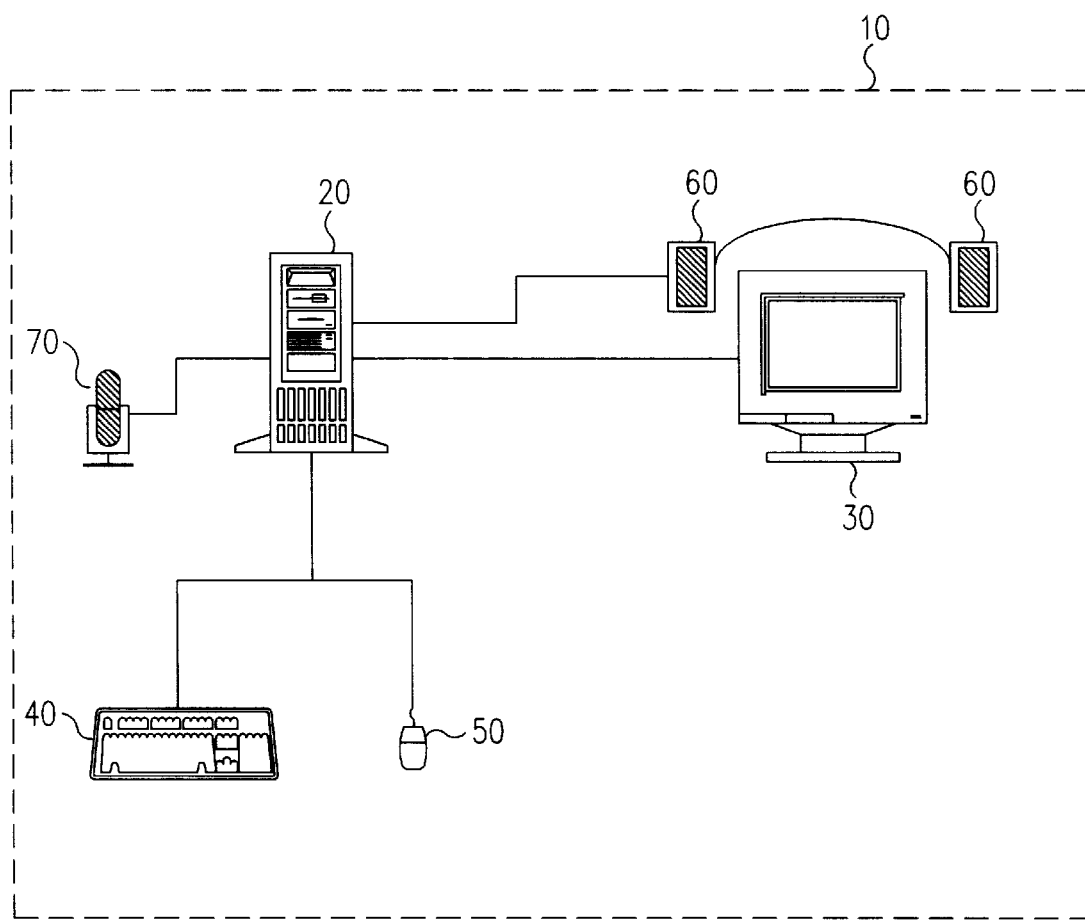
FIG. 1 is a schematic view of a computer system known in the art.

FIG. 1 is a computer system well known in the prior art. Computer system 10 comprises central processing unit (CPU) 20, display 30, keyboard 40, mouse pointing device 50, speakers 60, and microphone 70. A person of ordinary skill in the art will recognize that alternatives to input devices keyboard 40 and mouse 50 are readily available; accordingly, the present invention is not limited to computer systems having keyboard and mouse input devices only. Systems utilizing trackballs, eye-movement pointers, touch screens, and the like are also within the scope of the present invention.

Although a desktop personal computer is described, those skilled in the art will realize that computer systems other than a desktop personal computer can be used, such as embedded controllers, thin client network computers, television set-top boxes, telephones, pagers, or other advanced personal digital assistant (PDA) devices. Accordingly, the invention is not limited to any particular type of computer system.

Figure 2:
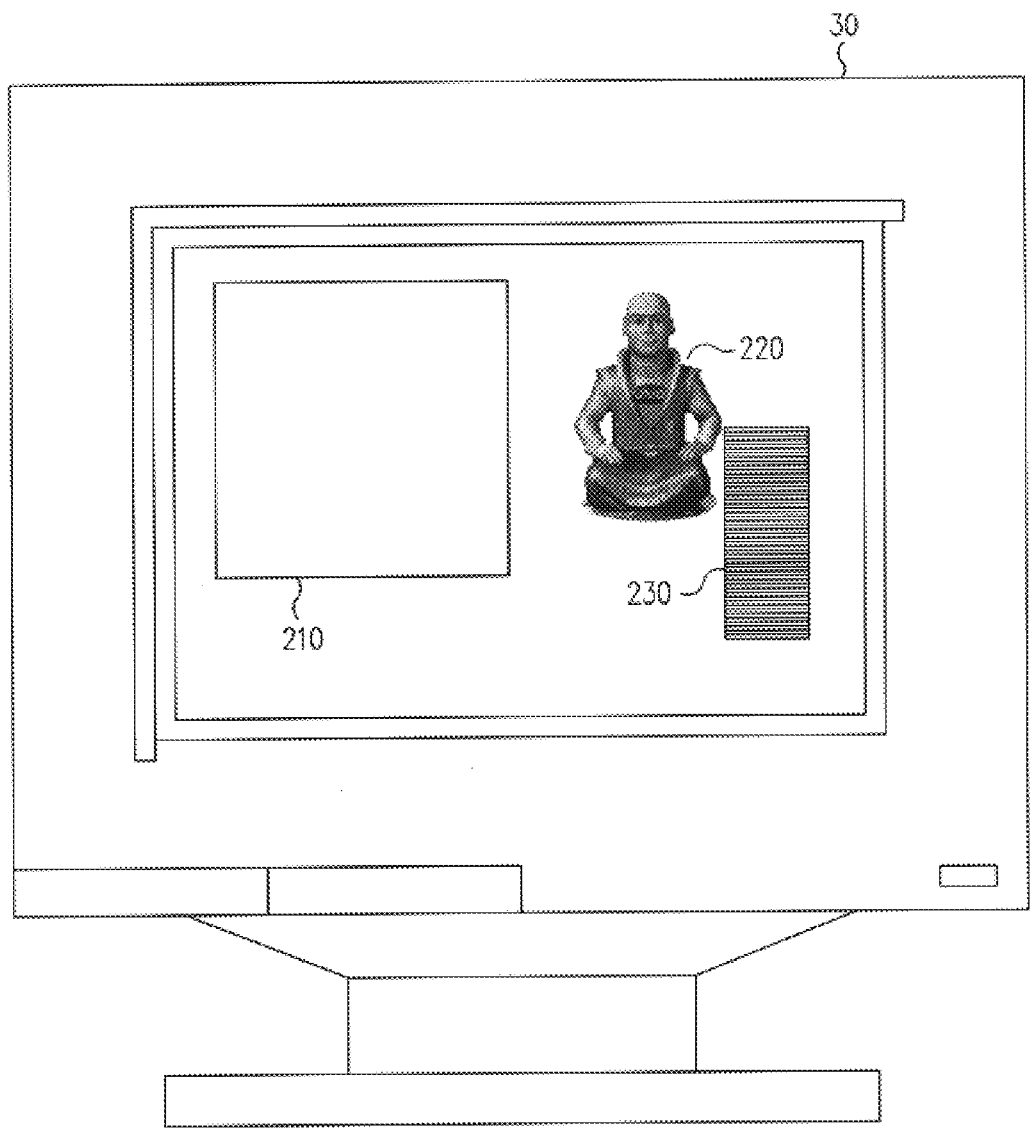
FIG. 2 is a view of a computer display according to one embodiment of the present invention.

The user interface according to one embodiment of the present invention is shown in FIG. 2, which is a view of display 30. Display 30 includes on it a conventional web browser window 210, presenting a web page in text and graphic form to the user. Agent character 220 appears alongside window 210. As will be discussed below, in addition to acting out animations and lip-syncing spoken text, aglent character 220 also presents a pop-up command menu 230. Pop-up command menus are well known in the art.

One embodiment of the present disclosure includes the following basic navigation and control commands in pop-up command menu 230:

Open/Go to {Link/Picture}: Saying "Open/Go to linkname" (linkname could be any link on HTML pages, includes dynamically modified pictures as well.) This is the same as clicking on linkname.

Go to Favorites: Goes to the designated favorites directory in the computer system. The agent will use the folder contents to build a new menu so that the user an also voice navigate contents of the favorites folder. It can drill down to a file and execute that file.

Read Page: Starts reading the text on the current page. Pauses after reading a paragraph or when the user hits the Scroll Lock key on the keyboard and asks if lie should continue or stop.

Read Selection: Starts reading the selected text within the current page. If no text is selected, the Agent will ask the user to make selection first.

Go Back—Goes back to the last page (same as clicking the back button on the toolbar)

Go Forward—Goes to the next page (same as clicking the forward button on the toolbar)

Stop—Stops the browser from completing the task (same as clicking the stop button)

Scroll Up—Same as Page up

Scroll Down—Continuously scroll down page

Scroll Left—Same as Page Left

Scroll Right—Same as Page Right

The agent interface program (or "agent") that displays agent character 220, in one embodiment of the present invention, operates "between" the user of the computer system and the target application program that the user wants executed. The agent responds to user inputs; such inputs may include commands to control the agent's own operation, e.g. quit, start speaking, stop speaking. Inputs may also include commands to be passed to the target application (represented by window 210), such as close application or, in the case of a web browser application, navigate to the page defined by a particular hypertext link.

Figure 3:
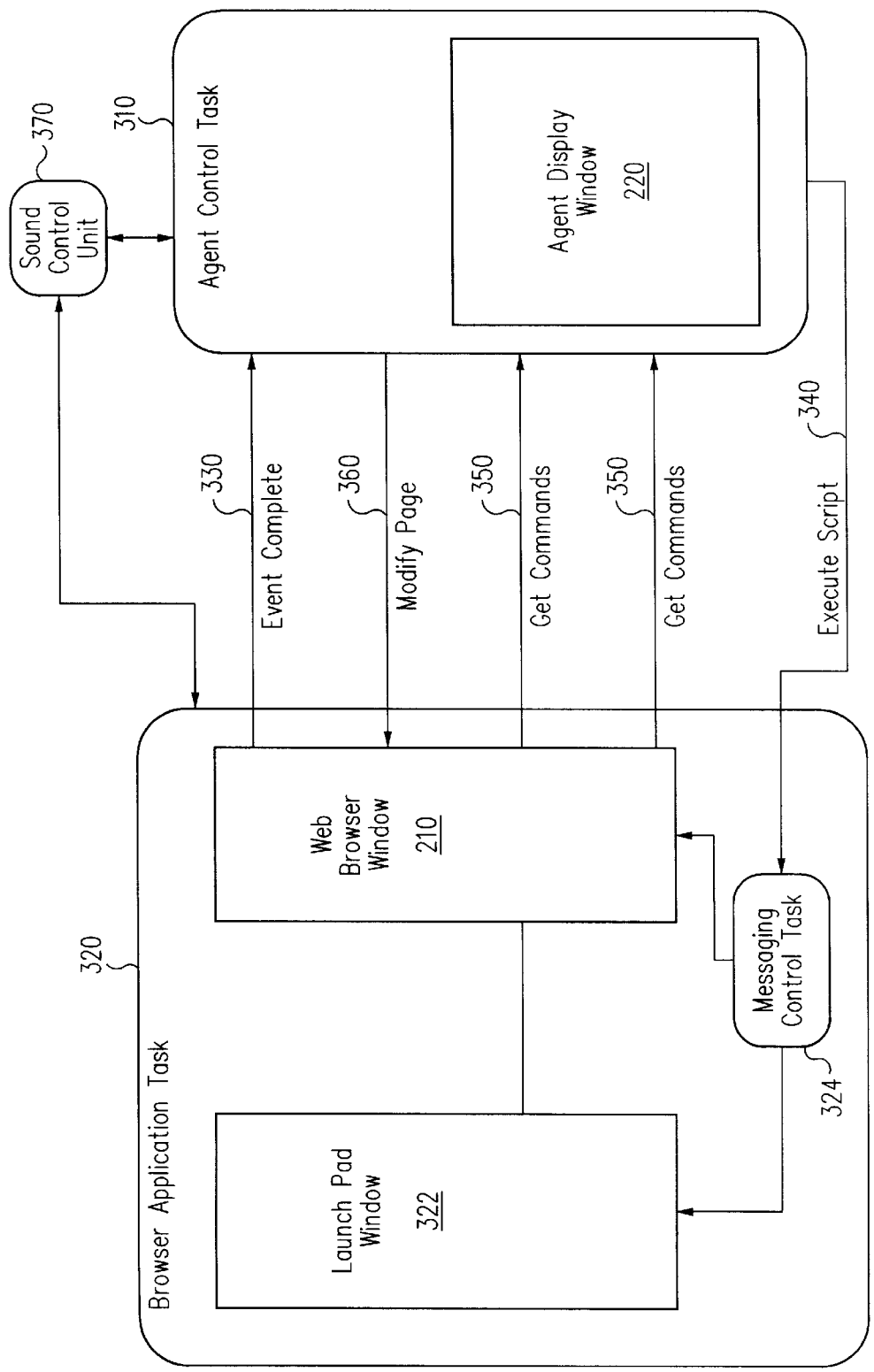
FIG. 3 is a schematic diagram of the communications paths between an agent and a browser application according to one embodiment of the present invention.

The agent communicates with both the user and the target application. FIG. 3 shows the communication paths between agent control task 310 and browser application task 320 (also referred to as browser task, browser application, or simply browser) according to one embodiment of the present invention.

Browser task 320 is a program running on the computer system of FIG. 1, displaying a set of windows to a user. In the embodiment of FIG. 3, task 320 is a web browser application, though the present invention is not limited to web browsers. One window, launch pad window 322, enables the user to start up agent control task 310, among other browser application control functions. As with all windows on a modern computer, the window itself is merely the display manifestation of a software process or task executing in the computer's CPU, such as the display of a document. Here, launch pad window 322 is a manifestation of the launch pad subtask, executing as part of browser application task 320.

Another subtask within browser application task 320 is messaging control task 324, which is responsible for communicating between the launch pad browser, and agent control tasks.

The launch pad task also communicates, via messaging control task 324, with other subtasks and applications, such as browser task 320 for web page navigation. Web browser window 210, in one embodiment, is the displayed manifestation of the target web page (itself a document) presented by browser application task 320.

In a typical interaction, browser task 320 is responsible for presenting web browser window 210 to the user. Browser task 320 sends a navigation event complete message 330 to agent control task 310 to indicate that the browser has completed loading the page. Agent control task 310 then executes script 340, which may effect the presentation of browser window 210 or launch pad window 322. Scripted operations may also include playing animations, speaking, and/or playing sounds, all of which may be manifested in agent display window 220 and through speakers 60 (shown in FIG. 1). Sound output, as called for in execute script 340, is produced by speakers 60 in response to commands from agent control task 310 sent through sound control unit 370. This sound control method is accomplished by conventional means well known in the art.

Processing Functions

Figure 4:
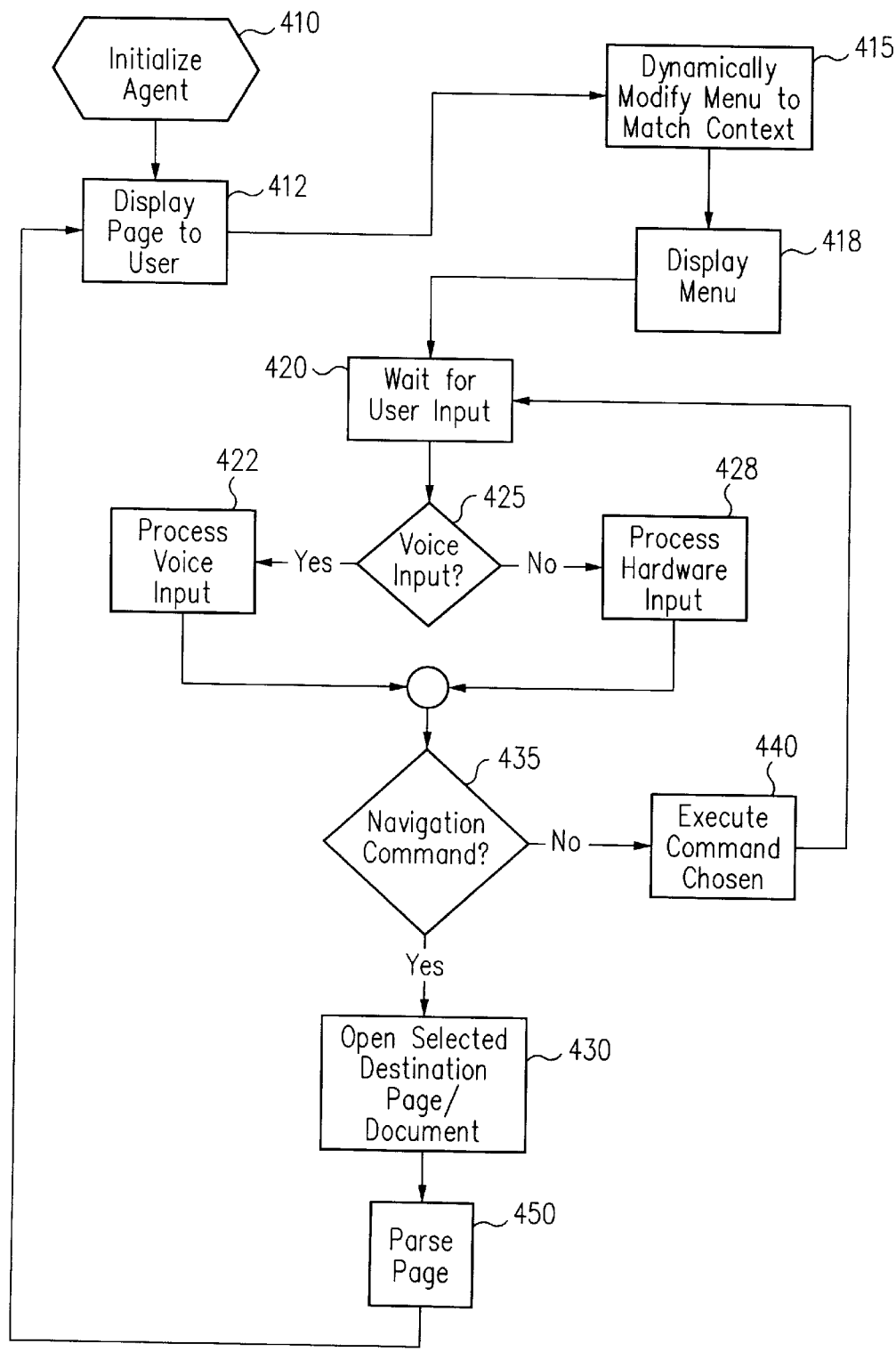
FIG. 4 is a flowchart of the process for performing processing, navigation, and control of an arbitrary document, according to one embodiment of the present invention.

FIG. 4 depicts the method employed by the agent-based interface in accordance with one embodiment of the present invention to navigate and control a document, including but not limited to a web page. The process begins at step 410 with initializing the agent software module. Sample C code used to initialize the agent in one embodiment of the present invention is as follows. While C and C++ are the languages used in the sample code snippets below, one skilled in the art recognizes that programming is not limited to these languages alone. Accordingly, the present invention is not limited to code written in the C or C++ language.

```
1) :
2) :
3) GetOptionsFromRegistry( );
4) m_pCWebBrowser2 = (CWebBrowser2
   *)pCWebBrowser2;
5) m_pCWebBrowser2Nag = (CWebBrowser2
   *)pCWebBrowser2Nag;
6) m_pCScopeDlg = (CDialog *)pCScopeDlg;
7)
8) m_pCAgentCtl = new CAgentCtl( );
9) ASSERT (m_pCAgentCtl);
10) m_pCAgentCtl->Create(NULL, WS_VISIBLE,
    CRect( ), (CWnd
    *)this, ID_AGENT_CONTROL);
11)    m_pIAgentCtlCharacters    =    new
    IAgentCtlCharacters(
    m_pCAgentCtl->GetCharacters( ) );
12) m_varBstr.bstrVal =
    GetCurrentCharacter( ).AllocSysString( );
13) m_pIAgentCtlCharacters->Load( (const char
    *)&lAgentID,
    m_varBstr);
14) m_pICharacterAgent = new IAgentCtlCharacter(
    m_pIAgentCtlCharacters->GetItem( (const char
    *) &lAgentID) );
15)
16) keybd_event( GetAgentHotKey( ), 0x45,
    KEYEVENTF_EXTENDEDKEY |0, 0 );
17) keybd_event( GetAgentHotKey( ), 0x45,
    KEYEVENTF_EXTENDEDKEY | KEYEVENTF_
    KEYUP, 0);
18)
19) m_pIAgentCommands = new IAgentCtlCommands(
    m_pICharacterAgent->GetCommands( ) );
```

20) m_pIAgentCommands->SetCaption( "Vaio Guide Commands"
);
21) m_pIAgentCommands->SetVoice( "Vaio Guide Commands".);
22) m_pIAgentCommands->SetVisible(TRUE);
23) m_pIAgentCtlCommandsWindow = new IAgentCtlCommandsWindow( m_pCAgentCtl->GetCommandsWindow( ) );
24)
25)
26) // create event sink
27) m_pBrowserSink = new CBrowserSink;
28) ASSERT (m_pBrowserSink);
29) m_pBrowserSink->m_pParent = this;
30) LPUNKNOWN pUnkSink = m_pBrowserSink->GetControllingUnknown( );
31) ASSERT (pUnkSink);
32) IUnknown * pUnkSrc;
33) pUnkSrc = m_pCWebBrowser2->GetControlUnknown( );
34) // hook up sink with connection point
35) VERIFY (AfxConnectionAdvise(pUnkSrc, IID_IBrowserSink,
pUnkSink, FALSE, &m_dwCookie) );
36)
37) GetVaioSpaceCommands( );
38) if (m_bShowCommandWnd) {
39) m_bShowCommandWnd = FALSE;
40) UpdatePage( );
41) m_bShowCommandWnd = TRUE;
42) } else
43) UpdatePage( );
44) RECT rect;
45) m_pCWebBrowser2Nag->GetWindowRect(&rect);
46) MoveAgentTo(rect.left-30, rect.bottom-100);
47) m_pICharacterAgent->Show(m_varFalse);
48) AgentIntroduction( );
49) :
50) :

In lines 8–14, the agent is created and the default agent character (in one embodiment, the Sony® VAIOMan) is loaded. Lines 16–17 allow the agent menu to be shown by simulating a keyboard key press. Lines 18–22 create, initialize, and load the agent commands window. Lines 23–32 create the event sink for the browser application so that the agent will know when the browser fires an event. Lines 33–43 identify default browser and agent interface commands. Lines 44–46 move the agent to its default location, make the agent visible, and execute the Agent Introduction function.

In step 412, the agent software then displays the current page of the document to the user. Next, the agent dynamically modifies its pop-up menu options 415 for display to the user 418 to reflect user selections appropriate to the context in which the displayed page is presented, as identified in lines 33–37 of the code sample immediately above. Such dynamic modification includes, for instance, showing options for document saving, printing, or formatting; for navigating forward and back amongst previously displayed pages; and any other command unique to the application in which the page is presented.

In one embodiment, the Sony VAIO® Space II user interface, the agent begins operation with a default set of menu choices, representing a base set of features in the VAIO Space interface. These features, which are actually categories of responses to user selections, are as follows:

Software Center
 Applications
 Accessories
Audio/Video Center
 Video
 Audio
 DVD
Online Center
 Easy Internet
 VAIO® Direct
 Club VAIO®
 Image Station
 Internet
VAIO® Center
 Desktop
 Web Links
Tool Center
 Tools
 Options
Help Center Sample code for implementing dynamic menu modification step 415 of the process, which is triggered when a page has been completely loaded into the navigation window, is as follows:

1) IShellFolderViewDual pShView( m_pcwebBrowser2->GetDocument( ) );
2) Folder pFolder(pShView.GetFolder( ) );
3) FolderItems pFolderItems(pFolder.Items( ) );
4) FolderItem pFolderItem;
5)
6) VARIANT varindex;
7) VariantInit(&varIndex);
8) V_VT(&varIndex) = VT_I4;
9) VARIANT varVerb;
10) VariantInit(&varVerb);
11) char szCommandName[INTERNET_MAX_URL_LENGTH];
12)
13) for(int i =0; i<pFolderItems.GetCount( ); i++) {
14) V_I4 (&varIndex) = i;
15) pFolderItem = FolderItem(pFolderItems.Item (varIndex)
);
16) sprintf(szCommandName, "2-I%d", i);
17) AddInvisibleCommand( szCommandName,
pFolderItem.GetName( ), pFolderItem.GetName( ) );

Once the menu content is modified by the agent software, the menu is displayed to the user, 418. The following snippet is sample code for displaying the commands in a popup window:

1) if(m_bShowCommandWnd) {
2) POINT oldCursorPoint;
3) GetCursorPos(&oldCursorPoint);
4)

```
5) SetCursorPos( m_pICharacterAgent->GetLeft( ) +
   m_pICharacterAgent->GetWidth( ) /2,
   m_pICharacterAgent-
   >GetTop( ) + m_pICharacterAgent->GetHeight( )/2 );
6) mouse_event( MOUSEEVENTF_RIGHTDOWN, 0,
   0, WHEEL_DELTA,
   0);
7) mouse_event( MOUSEEVENTF_RIGHTUP, 0, 0,
   WHEEL_DELTA,
   0);
8) SetCursorPos( oldCursorPoint.x, oldCursorPoint.y);
9)
```

At this point the process enters wait loop 420, waiting on user input. In one embodiment, shown below, the agent waits for spoken (verbal) commands for a few seconds.

```
1) if(m_bAutoListen) {
2) keybd_event( GetAgentHotKey( ), 0×45,
   KEYEVENTF_EXTENDEDKEY |0, 0 );
3) SetTimer (ID_LISTEN_TIMER, 5000, NULL);
4) }
5)
6) OnTimer function
7) void OnTimer( (UINT nIDEvent)
8) {
9) if (nIDEvent == ID_LISTEN_TIMER)
10) {
11) keybd_event( GetAgentHotKey( ), 0×45,
    KEYEVENTF_EXTENDEDKEY | KEYEVENTF_
    KEYUP, 0);
12) StopListenTimer( );
13) }
14)
15) COleControl: :OnTimer(nIDEvent);
16) }
```

Referring to FIG. 1, among possible user inputs are the traditional methods of interacting with a computer such as using a keyboard 40, mouse 50, touch screen, trackball or other pointing device, as well as using voice input. Voice input in this context refers to speaking into a microphone 70 or other sound capturing device and having the computer system process that sound and recognize its command content.

The next step in the process of FIG. 4 is a test to see if voice input has been supplied to the computer, 425. If there is no voice input, i.e., input is from hardware, 428, such as keyboard 40, mouse 50, or other device, execution then proceeds to testing whether or not the user input is a navigation command, 435.

If the user has spoken to the computer, that is to say given a voice command, the software processes the voice input 422 using conventional means. After this point processing behaves the same whether the input was through hardware means or via voice, execution proceeds to testing the input for a navigation command, step 435.

If the user has chosen a command that does not require navigation through the document, i.e., does not call for moving forward or back a page or scrolling up and down within the current page or document, then the software executes the command chosen 440 by conventional means and loops back to waiting for user input, 420. Such a non-navigating command includes, for example, Print, Save, Quit, and other commands well-known in the computing arts. It also includes commands to cause the agent to speak, i.e., to read selected text back to the user. In one embodiment of the present invention, when a Read Selection command is triggered, the agent starts reading the selected area. If no area is selected, the agent tells the user to select some text before issuing that command. Below is part of that code.

```
1) void ReadSelection( )
2) {
3) IHTMLDocument2 dIHTMLDocument2;
4) IHTMLSelectionObject dIHTMLSelectionObject;
5) IHTMLTxtRangedIHTMLTxtRange;
6) CString szSelectedText;
7) IHTMLFramesCollection2 dIHTMLFramesCollec-
   tion2;
8)
9) dIHTMLDocument2 = m_pCWebBrowser2-
   >GetDocument( );
10)       dIHTMLFramesCollection2      =
   dIHTMLDocument2.GetFrames( );
11) if(dIHTMLFramesCollection2.GetLength( ) >0) {
12) IHTMLWindow2 dIHTMLWindow2;
13) IHTMLTxtRange dIHTMLTxtRange;
14) VARIANT varT;
15) VariantInit(&varT);
16) VARIANT varindex;
17) VariantInit(&varIndex);
18) V_VT(&varIndex) = VT_I4;
19)
20)        for(int       i=0        ;
    i<dIHTMLFramesCollection2.GetLength( );
    i++) {
21) V_I4(&varIndex) =i;
22) varT = dIHTMLFramesCollection2.item(&varIndex);
23) dIHTMLWindow2 = varT.pdispVal ;
24)        dIHTMLDocument2         =
    dIHTMLWindow2.GetDocument( );
25) dIHTMLSelectionObject =
    dIHTMLDocument2.GetSelection( );
26) dIHTMLTxtRange =
    dIHTMLSelectionobject.createRange( );
27) szSelectedText += dIHTMLTxtRange.GetText( );
28) }
29) else {
30) dIHTMLSelectionObject =
    dIHTMLDocument2.GetSelection( );
31) dIHTMLTxtRange =
    dIHTMLSelectionObject.createRange( );
32) szSelectedText = dIHTMLTxtRange.GetText( );
33) }
34)
35) if(szSelectedText.IsEmpty( ) )
36) szSelectedText="Please use mouse to mark your
    selection first!";
37) m_pICharacterAgent->Speak( (char
    *)LPCTSTR(szSelectedText) );
```

Web Page Navigation

On the other hand, if the user has chosen a navigation command then the software must open the selected web page or document in step 430. In the context of a web page, this step comprises following a link to a new page, downloading that page's HTML codes, and processing those codes (within the browser application) into a screen display.

In applications other than a web browser, a new document or a new window may be opened or displayed. Such navigation commands may also include scrolling up or down within the currently open document.

In one embodiment of the present invention, the scrolling function is implemented in the following) code snippet. When a Scroll Down command is issued, a scroll timer is set. Every 500 milliseconds, the display moves down (scrolls down) the web page by 20 pixels until the bottom of the page is reached or a stop scrolling command is issued. Although a fixed-speed scrolling embodiment is described, those skilled in the will art realize that scrolling at other than a fixed speed can be readily implemented. Accordingly, the invention is not limited to any particular scrolling speed.

1) void WebPageScrollDown( )
2) {
3) IHTMLDocument2 dIHTMLDocument2( m_pCWebBrowser2- >GetDocument( ) );
4) IHTMLWindow2 dIHTMLWindow2 = dIHTMLDocument2.GetParentWindow( );
5) IHTMLTextContainer dIHTMLTextContainer = dIHTMLDocument2.GetBody( );
6) IHTMLControlElement dIHTMLControlElement = dIHTMLDocument2.GetBody( );
7)
8) if( dIHTMLTextContainer.GetScrollTop( ) != dIHTMLTextContainer.GetScrollHeight( )–20 ) {
9) dIHTMLWindow2.scroll (dIHTMLTextContainer.GetScrollLe ft( ) , dIHTMLTextContainer.GetScrollTop( )+20 );
10) SetTimer (ID_SCROLL_TIMER, 500, NULL);
11) gbScrollTimerOn = TRUE;
12) }
13) AddCommand("2-Y", "Stop scrolling", L"Stop scrolling", L"Stop [scrolling]");

Web Page Parsing

Figure 5:
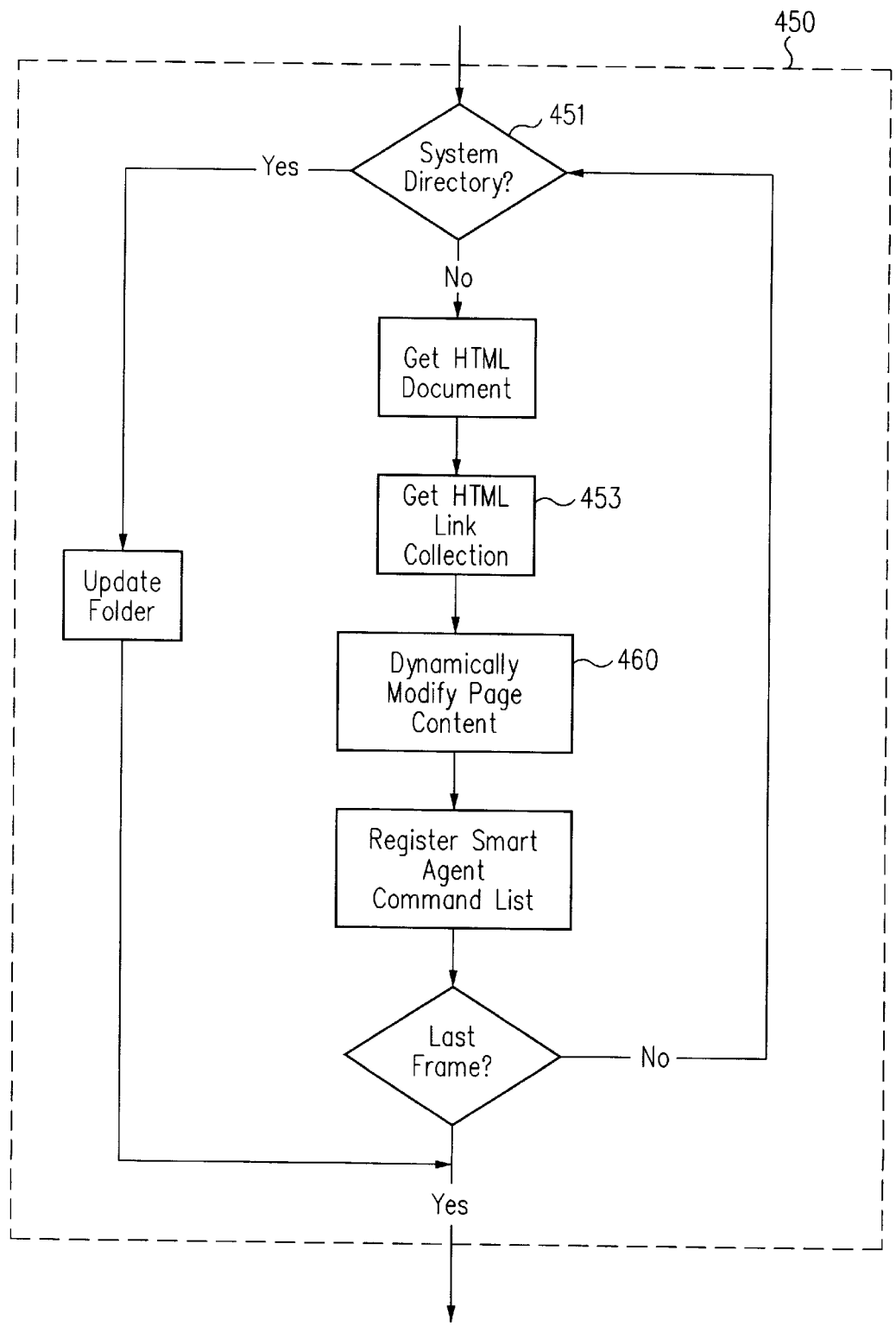
FIG. 5 is a flowchart of the detail steps within Parse Page step 450 of FIG. 4.

Once the new page is opened by the process, the agent must parse the page, 450, to identify its content, voice enabled features, and any commands specific to the context in which the page is displayed. FIG. 5 describes the process of parsing a web page in greater detail.

Figure 7:
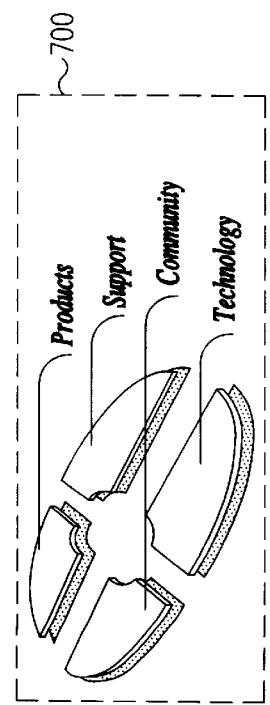
FIG. 7 is a prior art image map as it appears to a user.

First, the process checks to see if the page opened is a system directory, such as a framed directory to VAIO Space features 451 in FIG. 5. The process then searches 453 for the presence of image maps or untagged links within the page currently displayed (step Get HTML, Link Collection 453). An image map, in the web art, refers to a graphic image in which various regions of the figure, or the figure in its entirety, represent links to other documents or pages. FIG. 7 is an example of an image map within a web page displayed in browser window 210, as it appears to a user. In typical use, image map 700 is not necessarily labeled (when presented to the user) as pointing towards other pages or documents. However, within the image map's HTML codes (shown in FIG. 8) are the necessary instructions to redirect the browser application to particular page, depending on the region within the image map selected by the user.

If collection 453 (FIG. 5) finds that there are image maps or untagged links, i.e., links that do not have a voice enabled or readable text tag (such as the HTML "ALT" tag 810 in FIG. 8) associated with them, the process then dynamically modifies the page, (step 460 of FIG. 5, further described in FIG. 6), to place voice enabled tags on all links within image maps and on the untagged links. Tagged links (those with an ALT tag 810 specified) are given the name defined by the ALT tag, steps 462–464 in FIG. 6. These modifications are made to the page content prior to displaying the page to the user, step 412 of FIG. 4.

Figure 9:
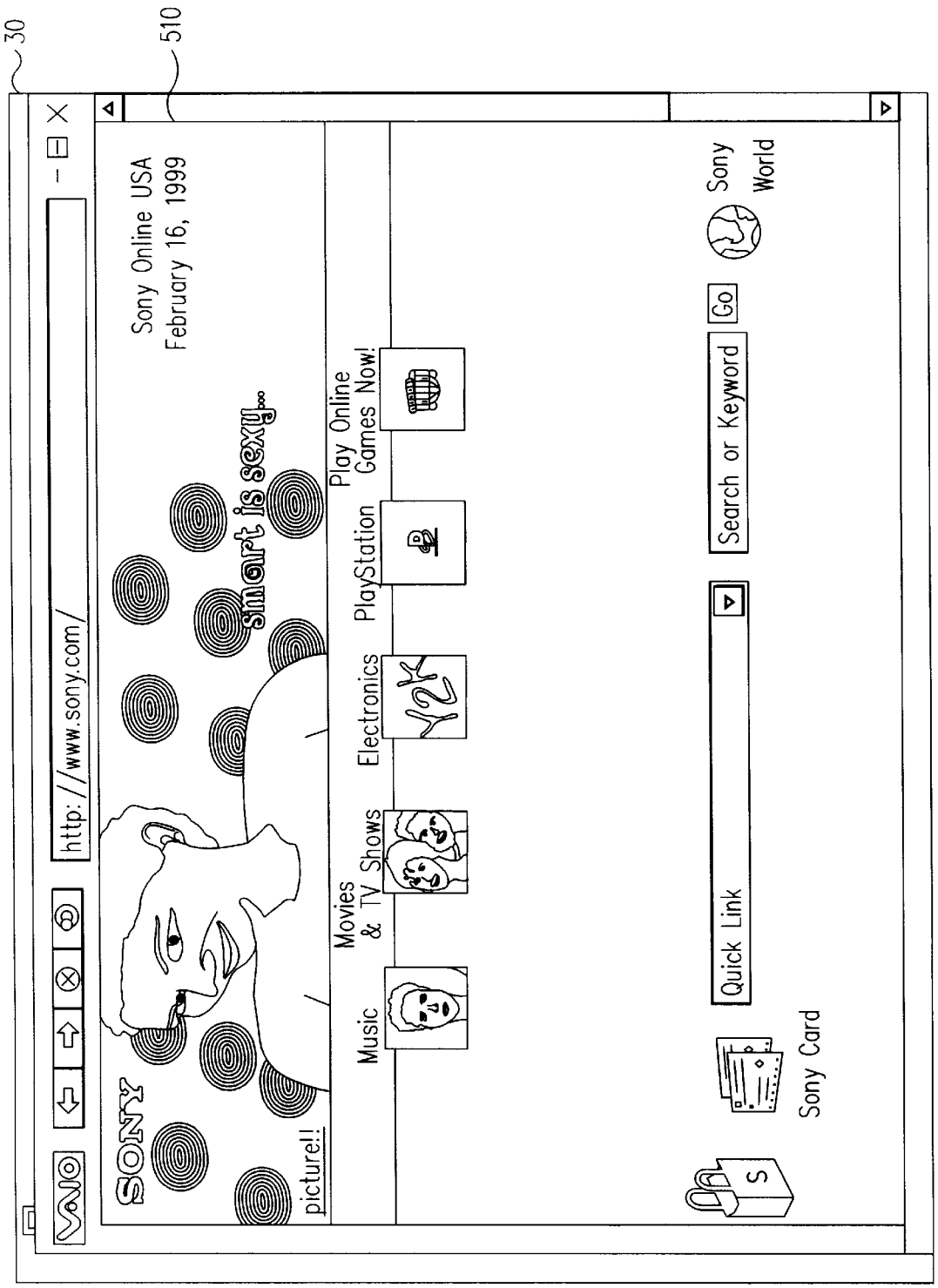
FIG. 9 is a representative prior art web page as it appears to a user.

FIG. 9 shows one example of a web page containing simple images maps. FIG. 10 is the HTML code that is used to present the page of FIG. 9 to the user.

Figure 11:
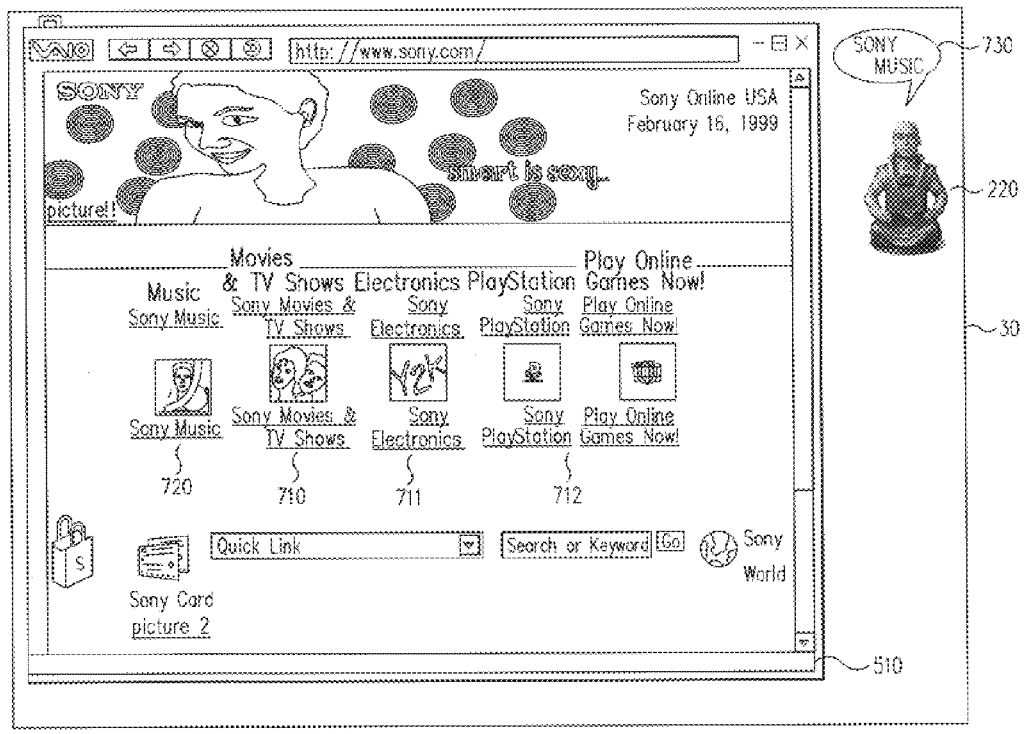
FIG. 11 is the dynamically modified web page of FIG. 9 according to one embodiment of the present invention, showing the inserted voice-enabled tags.

FIG. 11 shows the web page of FIG. 9 after the dynamic page modification step 460 (referring to FIG. 5). Tags 710, 711, and 712 have been added to show the hyperlinks embedded in the page. Tag 720 shows the result of finding an embedded ALT tag in the HTML code of FIG. 10.

Also depicted in FIG. 11 is the agent's ability to speak the text of the page, here the tag associated with hypertext link 720. as depicted by word balloon 730 coming from Agent 220. The modified HTML codes for the page are shown in FIG. 12.

Appendix A contains an example of a C language program that can implement the dynamic page modification step 460, according to one embodiment of the present invention. One of ordinary skill in the art will of course realize that other software languages and codings can be used to implement this function. Accordingly, the present invention is not limited to any particular language or coding or the particular program listing example of Appendix A.

If there are no image maps or other requirements to dynamically modify the page, the page is immediately displayed 412 to the user. At this point the entire process loops again through dynamic menu modification 415 and display menus 418 and enters the wait loop for user input 420.

Figure 6:
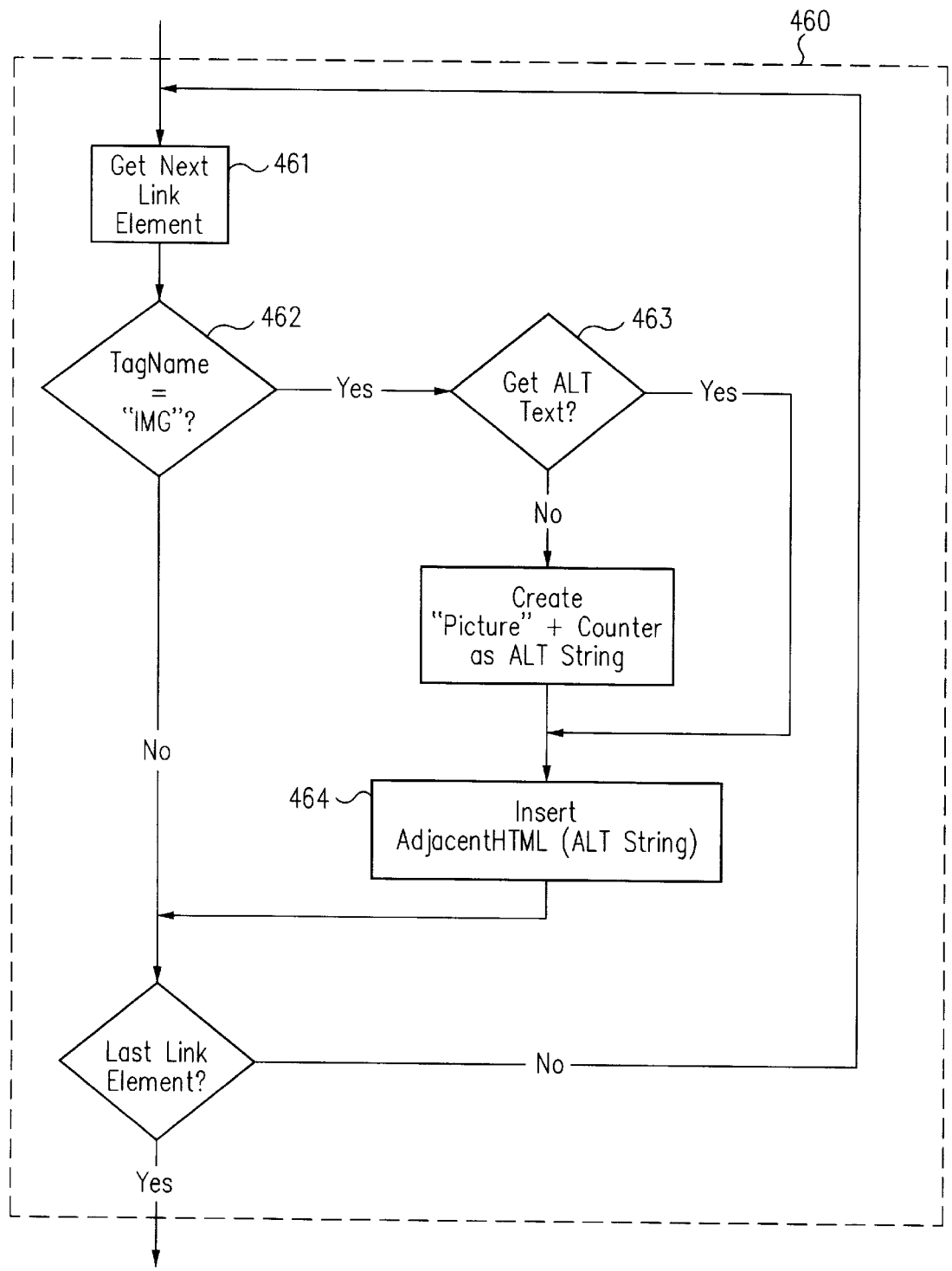
FIG. 6 is a flowchart of the detail steps within Dynamically Modify Page Content step 460 of FIG. 5.

Referring to FIG. 3, step 450 of the process shown in FIGS. 4–6 is performed by agent control task 310. Agent control task 310 also identifies context-unique menu options specific to the chosen page, if any (steps 415 and 418 of FIG. 4). This latter function corresponds to get commands 350.

Those skilled in the art will realize that the particular order of the operations depicted in FIG. 4 is purely illustrative. In fact, these operations can be performed in any order that does not violate the data dependencies described herein.

Scripting Language

In one embodiment of the present invention, the agent-based user interface is controlled by a high-level computer scripting language to better enable rapid, simplified creation of interface behaviors.

A script language (also referred to as a markup language) is a predefined set of commands and an associated command syntax that is interpreted by a script-executing program. Script-driven program operation is not new to the art; most modern compiler and communications programs arc driven by some form of script language. The result of the script interpretation is a longer list of computer instructions to be executed by another, separate program. Scripts are further detailed in Cheong, discussed above. Unlike many other computer languages, a script is a macro language consisting of short, relatively simple directives that in turn automatically cause a series of more complex computer instructions to execute.

The scripting embodiment of the present invention provides a rapid and easy to use means for customizing the user experience. The script itself is a text file formatted according to a particular syntax, disclosed herein. One example of a script in accordance with the present invention is the tour program created to introduce a user to the VAIO Space browser program and its agent-based interface.

The tour script is executed by agent control task 310 (FIG. 3). The tour script controls the behavior of the VAIOman character by controlling agent control task 310. Agent control task 310 in turn controls agent display window 220, passes messages to browser application task 320 via messaging control task 324 (execute script 340), and sends sounds and control signals to sound control unit 370.

One of ordinary skill in the art will recognize that script language uses other than tour programs (themselves well known in the art) readily exist. Accordingly, the present invention is not limited to any particular use of the script language disclosed. Rather, the present invention encompasses within its scope any programming use that the script language may be adapted to by a programmer.

Script Language Syntax

A script file according to the present invention is written according to a predefined syntax and format. The script file consists of one or more sections separated by blank lines. Each section begins with a name token of the form:

[Section Tag]

where Section Tag is the name of the section. The square brackets denote the line as a section tag. For clarity, sections may be broken into subsections by inserting blank lines. A section consists of all lines between one section tag and the next.

Each non-blank line in a section represents a particular operation and is in the form Operator: Operand where Operator is the command token and Operand is the specific argument to be used by the command. The operand must be defined when the script is written as a data value of the correct type, e.g. a character string or an integer variables as operations are not supported; there is no user interaction with the script file content other than script execution.

In the VAIO Space scripting embodiment there are only seven operators. These operators and their corresponding operands are:

NavigateToPage: URL

MoveTo: x, y

GestureAt: x, y

LoopAnimation: Animation_name, duration

PlayAnimation: Animation_name2

SpeakText: Speak_Text

SpeakWav: Speak_Wav wherein each operand refers to the following:

URL—Uniform Resource Locator (URL), as used in the World Wide Web/Internet art, of the particular page to show in the VAIO Space navigation section.

x, y—Location on the screen relative to the origin that the character moves to (MoveTo operator) or gestures toward (GestureAt operator).

Animation_name—File name for the special looping animations that the character plays for the specified duration. An animation is defined generally as a sequences of timed and optionally branched frames, each frame composed of one or more static images. These animations are, for example, Processing, Searching, Writing, etc. These animations require user intervention to stop and prevent the character from doing anything else while playing the animation. This is essentially why duration needs to be specified. Looping stops after the specified time has elapsed.

Animation_name2—This is a one-shot, non-looping animation for the character to play. This animation is a standard animation and requires no user intervention to stop it. If SpeakText is specified, the character speaks while displaying this animation.

Speak_Text—This is the text the character will speak. The text appears in the word balloon of the character while it speaks. If a Speak_Wav is given, this text is shown in the balloon while the character is playing the recorded file; in such case the character appears to be lip-synching.

Speak_Wav—A Wav file or linguistically formatted file (.lpv) that the character will play. If SpeakText is provided then Speak_Text appears in the character's balloon while the recording is being played. If no SpeakText is provided, the balloon is empty and invisible (such as when a Wav file is specified) or the text associated in the linguistically formatted .lpv file is used.

In an alternate embodiment of the present script language, multiple operations are present in a single line of the script file, separated by a delimiter character. The delimiter may be a single character, such as the tab character, or a character string, such as "++".

Sample Script

The following is an example of a script language code snippet used to describe the "Software Center" aspect of VAIO Space. This description is accomplished by presenting to the user an auditory and visual depiction of the function of the "Software Center."

1) [SOFTWARE CENTER]

2) MoveTo: 160, 150

3) LoopAnimation: Processing, 5

4) GestureAt: 200, 300

5) SpeakText: This is the software center of VAIO Space 2.0.

6)

7) PlayAnimation: GestureLeft

8) SpeakText: You store your software in here.

9)

10) MoveTo: 300, 40

11) PlayAnimation: GestureUp

12) SpeakWav: C:\wavfiles\softwarecenter.wav

13)

14) [New Section Tag]

15) :

16) :

In this instance, the [Software Center] section denotes the part of the script that activates in response to user selection of the "Software Center" category as a destination in the VAIO Space tour. In response to the user's choice, the character moves to location 160, 150 on the screen, displays the "Processin" animation for 5 seconds, gestures toward location 200, 300 on screen and says "This is the software center of VAIO Space 2.0" while still gesturing. Then it gestures left and says "You store your software in here." Finally, it moves to location 300, 40 on the screen and, while gesturing up, plays the "softwarecenter.wav" file and lip-syncs as the recording is playing. The word balloon is not displayed during the Wav file playback.

VAIO Space Tour Example

The interactive VAIO Space tour program is designed to help the user become familiar with VAIO Space. The tour provides a user friendly, interactive presentation instead of the usual canned (pre-recorded, non-interactive) tour seen in the prior art. In the tour program, the actions and behaviors of the agent are controlled by the tour script. Sections of the tour script file are read and executed by the tour program in response to user inputs and actions.

When the tour program starts up, the VAIOman character 220 (FIG. 2) is created and displayed in its own window. A popup menu 230 showing the different command options presently available is displayed. Among the command options are a list of topics or categories representing major subdivisions of the tour. Applying the metaphor of a walking tour, the categories present virtual "places" from which to begin. (One example of a starting place is the Software Center discussed above.) The user then simply tells the program, either via speech or mouse, from which category to start the tour. The script for that category (and subsequent categories) is read as needed by the tour program; the character performs the actions specified by the script.

Referring to FIG. 3, the tour program communicates with the VAIO Space browser program (or task) 320 by means of a registry and messages well known in the programming art. This registry and message interface is represented by messaging control task 324. The VAIO Space browser task 320 handles navigation and synchronization. The following code snippet shows how messages are passed.

1) m_VaioProfiler.SetValueString ("Page", NavPage, 255);
2) m_DoneNavigating = FALSE;
3)
4) // Send scope to navigate that Page
5) ::SendMessage(m_hVaioWnd, WM_NAVIGATE_PAGE, 0,
   (LPARAM) m_hWnd);

During the tour, the program can be interrupted by either clicking on or double clicking on the agent character, or by hiding the character. When the tour is asked to continue, it can continue from where it stopped or it can start from the beginning. One can also quit the tour by choosing the Quit command from the agent character's popup menu 230 (FIG. 2).

When a specific category is chosen from the character's menu (or recognized as spoken input), the tour program interprets the selected category name as the section tag and executes the corresponding section of the script. The character then performs the actions specified. The tour program accesses the script file section for a particular category only once for the lifetime of the tour program.

A linked list (an agent program-defined structure) is maintained and used to store the category names and the script section corresponding to each category. Below is a sample structure:

1) typedef struct tagScript{
2) int moveTo[2];
3) int gestureAt[2];
4) CString playAnimation;
5) CString loopAnimation;
6) int loopAnimationPlayLength;
7) CString speakText;
8) CString speakWav;
9) CString navigatePage;
10) struct tagScript *next;
11) }SCRIPT, *LPSCRIPT;
12)
13) typedef struct tagCategories {
14) CString CategoryName;
15) LPSCRIPT CategoryScript;
16) struct tagCategories *next;
17) } CATEGORIES, *LPCATEGORIES;

The initial menu in the VAIO Space tour consists of the following category choices and commands:

Introduction
Start from Software Center
Start from AV Center
Start from Online Center
Start from Tool Center
Start from Help Center
Start from Continue Tour
Start from Restart Tour
Quit Tour Although the initial menu specific to the VAIO Space Tour is described, those skilled in the will art realize that menus other than this example can be used. Accordingly, the invention is not limited to any particular menu configuration as an initial starting presentation to the user.

Script Execution

Figure 13:
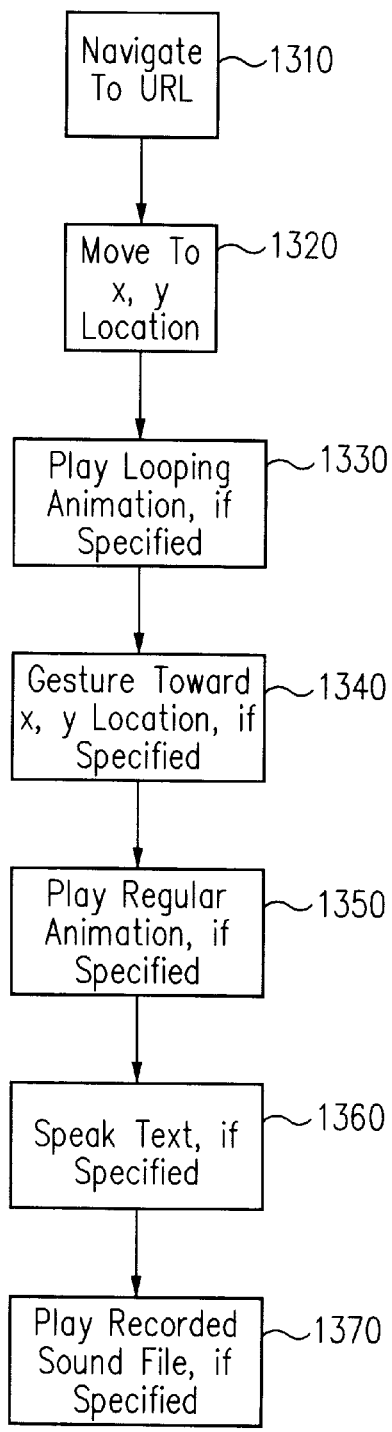
FIG. 13 is a flow diagram of script language processing according to one embodiment of the present invention.

The order of the actions followed by the agent in executing a particular category script is as shown in FIG. 13.

Script execution begins by causing the browser application to open the page specified by the NavigateTo URL, 1310, if specified. The agent display window 220 (FIG. 2), i.e., the agent's physical manifestation on the computer display, then moves to the specified x, y screen location, 1320. If a looping animation file is specified, it is played for the time given by duration, 1330.

Once any looping animation concludes, or if no looping animation is specified, the agent display will gesture towards the display location x, y specified, 1340. Note that, as with the looping animation, the GestureAt step may be omitted.

After gesturing, the regular or one-shot animation, if any, is played, 1350.

Agent speech begins at step 1360. While the agent speaks (lip-syncs) the specified text, a word balloon 730 (FIG. 11) appears above its head. The word balloon feature may be enabled and disabled by the user. In the event that a recorded file is specified without speech, the file (Wav or .lpv) is output through the computer's sound subsystem; the agent does not lip-sync nor is the word balloon displayed.

Other than looping animations, which require user intervention to stop (hence the duration requirement), other animations and gesture-at actions are played while the character speaks.

If any operation is omitted the script does not perform it. Every script section has at a minimum one operation, but no operation is mandatory.

If the tour program is interrupted, the character is put into an idling state or hidden, at the user's option. The user can restart the tour, go to the same or different category, or quit. While the character is in an idling state (or hidden), the user can continue working with the VAIO Space browser or another application and return to the tour later.

If at any time in the tour the agent interface program is shut down (i.e., agent control task 310 terminates), the tour quits. If the VAIO Space browser program 320 is not running, the tour will not start. When a particular tour guide character 220 is created at tour program initialization, any agent character(s) previously created are temporarily hidden and not shown until the tour ends.

When the user elects to start the tour from one of the VAIO Space categories, the tour is set on a timer and the synchronization between navigation in VAIO Space and the agent script is set up. A new page cannot be navigated (or a new tour section run) unless the previous script has finished execution. Below is the part of the code that handles this synchronization.

```
1) BOOL found = FALSE;
2) AgentStopAll ( );
3)
4) BeginTour( );
5)
6) while(!found && m_pCurrentCategory)
7) {
8) if (m_pCurrentcategory->CategoryName == cmdName)
9) {
10) found = TRUE;
11) break;
12) }
13) m_pCurrentCategory =m_pCurrentCategory->next;
14) }
15)
16) if(found)
17) {
18) BOOL scriptFound = FALSE;
19) CString sectionName;
20) if (cmdName == "Introduction")
21) {
22) sectionName = m_pCurrentCategory->CategoryName;
23) if(m_pCurrentCategory->CategoryScript == NULL)
24) {
25) sectionName.MakeUpper( );
26) scriptFound = GetScript(CString("[" + sectionName + "]") );
27) }
28) if(scriptFound)
29) {
30) m_pScriptReader =0 m_pCurrentCategory->CategoryScript;
31) ReadIntroduction( );
32) }
33) }
34) else
35) {
36) if(!m_bTimerSet)
37) {
38) m_bTimerSet = TRUE;
39) SetTimer(TOUR_EVENT_ID, 2000, NULL);
40) ReadNextScript( );
41) }
42) }
43) }
44) else
45) {
46) CString csSpeak = CString("Could not find the selected
   section –") + cmdName;
47) AgentSpeak(csSpeak, "");
48) }
49)
50) if(!m_pCurrentCategory)TourOver( );
```

The part of the synchronization code residing within the timer handler function is as follows:

```
1) if(nIDEvent == TOUR_EVENT_ID)
2) {
3) if(m_bScriptFinished && m_bDoneNavigating)
4) {
5) m_bScriptFinished = FALSE;
6) if(m_pCurrentCategory)
7) {
8) ContinueTour( );
9) m_pCurrentCategory = m_pCurrentCategory->next;
10) }
11) }
12) else
13)
14) if(m_bDoneNavigating && m_bSpeechEnded)
    ReadNextScript( );
```

CONCLUSION

Thus, as shown and disclosed herein, the present invention enables navigation and control of an arbitrary computer realized document, using in some embodiments voice recognition and/or an agent-based user interface. The present invention addresses shortcomings in the prior art relating to web pages with embedded image maps and untagged links, sightless users, and the complexity and inflexibility of prior art agent software. By presenting a voice enabled interface to the user, tailored to both document/web page content and applications, the present invention improves upon the current state of the art. Furthermore, the present invention facilitates computer use, especially web surfing, by the sightless via its capacity to read back the content of any document or web page, including context sensitive menu options and embedded hypertext links common to web pages.

Furthermore, the present invention enables the rapid creation of executable code for controlling the behaviors and functionality of a software agent operating in conjunction with an agent-based navigation system. Using the present invention, a programmer can rapidly prepare an executable agent script that can immediately be performed by an agent in response to a user input or external stimulus, such as receipt of a message or an application program event. The present invention also provides added utility by virtue of its simplicity. Agent scripts can be prepared by one of minimal skill in programming and without reference to complex languages such as C or C++.

Sony® and VAIO® are registered trademarks and VAIOMan and VAIO Space II are trademarks of Sony Corp. of America, San Jose, Calif. Microsoft® is a registered trademark and ActiveX is a trademark of Microsoft Corp., Redmond, Wash.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

APPENDIX A

Sample C Language Program Listing: Dynamic Page Modification function
The following code excerpt is © 1999 Sony Corp. of America.

```c
void CVaioAgentCtrl::UpdateLinks( )
{
    IHTMLWindow2    dIHTMLWindow2;
    IHTMLFramesCollection2    dIHTMLFramesCollection2;
    IHTMLDocument2    dIHTMLDocument2;
    IHTMLBodyElement    dIHTMLBodyElement;
    IHTMLTxtRange    dIHTMLTxtRange;
    IHTMLFrameBase    dIHTMLFrameBase;
    VARIANT varT;
    VariantInit(&varT);
    VARIANT varIndex;
    VariantInit(&varIndex);
    V_VT(&varIndex) = VT_I4;
    iLinkNumber = 0;
    iImageLinkNumber = 0;
    lReadingTextPoint = 0;
    TRY{
            dIHTMLDocument2 = m_pCWebBrowser2->GetDocument( );
            CString szTitle = "You are at " +
dIHTMLDocument2.GetTitle( );
            m_pICharacterAgent->Speak((char *)LPCTSTR(szTitle)
);
            m_pCWebBrowser2->SetForegroundWindow( );
            szTitle = dIHTMLDocument2.GetUrl( );
            if(szTitle.Find("C:/SonySys/Vaio2.0/Panels/") != -1
){ // Sony customerized page
            IHTMLElementCollection dIHTMLElementCollection =
dIHTMLDocument2.GetAll( );
            IHTMLElement dIHTMLElement;
            IHTMLFrameElement dIHTMLFrameElement;
            for(int i=0;
i<dIHTMLElementCollection.GetLength( ); i++) {
                    V_I4(&varIndex) = i;
                    dIHTMLElement =
dIHTMLElementCollection.item(varIndex, varIndex);
                    TRACE("Tag is %s\n",
dIHTMLElement.GetTagName( ));
                    //make sure it is VaioSpace customerized page,
check ID in html tag
                    if( dIHTMLElement.GetTagName( ) == "HTML" )
                        if( dIHTMLElement.GetId( ) != "VaioSpace
HTML" )
                            break;
                    if( dIHTMLElement.GetTagName( ) == "FRAME" &&
dIHTMLElement.GetId( ) == "VaioSpace Folder" ) {
                        dIHTMLFrameElement =
dIHTMLElementCollection.item(varIndex, varIndex);
                        IWebBrowser2
dIWebBrowser2(dIHTMLFrameElement);
                        TRACE("GetLocationURL( ) is %s\n",
dIWebBrowser2.GetLocationURL( ) );
                        LPDISPATCH lpDisp =
dIWebBrowser2.GetDocument( );
                        if(!lpDisp) {
                            m_pICharacterAgent->Speak("NULL
Pointer!");
                            return;
                        }
                        IShellFolderViewDual pShView( lpDisp );
                        Folder pFolder(pShView.GetFolder( ));
                        FolderItems pFolderItems(pFolder.Items( ));
                        FolderItem pFolderItem;
                        char
szCommandName[INTERNET_MAX_URL_LENGTH];
                        if( !AddDefaultBrowserCommand(TRUE) )
return;
                        for(int j=0; j<pFolderItems.GetCount( );
j++) {
                            V_I4(&varIndex) = j;
                            pFolderItem =
```

APPENDIX A-continued

```
        FolderItem(pFolderItems.Item(varIndex) );
                            sprintf(szCommandName, "2-i%d", j);
                            AddInvisibleCommand( szCommandName,
pFolderItem.GetName( ), pFolderItem.GetName( ));
                            //AddCommand( szCommandName,
pFolderItem.GetName( ), pFolderItem.GetName( ));
                    }
                    return
                }
            }
        }
    if( !AddDefaultBrowserCommand( ) ) return;
    // enum the frames
    dIHTMLFramesCollection2 =
dIHTMLDocument2.GetFrames( );
    if(dIHTMLFramesCollection2.GetLength( ) > 0) {
        TRACE("we have %d frames\n",
dIHTMLFramesCollection2.GetLength( ) );
        szReadingText = " ";
        for(int i=0;
i<dIHTMLFramesCollection2.GetLength( ); i++) {
            V_I4(&varIndex) = i;
            varT =
dIHTMLFramesCollection2.item(&varIndex);
            dIHTMLWindow2 = varT.pdispVal;
            dIHTMLDocument2 = dIHTMLWindow2.GetDocument( );
            dIHTMLBodyElement = dIHTMLDocument2.GetBody( );
            dIHTMLTxtRange =
dIHTMLBodyElement.createTextRange( );
            szReadingText += dIHTMLTxtRange.GetText( );
            AddLinksFromDocument (dIHTMLDocument2);
        }
    }
    else {
        dIHTMLBodyElement = dIHTMLDocument2.GetBody( );
        dIHTMLxtRange =
dIHTMLBodyElement.createTextRange( );
        szReadingText = dIHTMLTxtRange.GetText( );
        AddLinksFromDocument(dIHTMLDocument2);
    }
    }
    CATCH_ALL(e)//catch(CException* excp)
    {
      e->Delete( );
      m_pICharacterAgent->Speak("I have some problem to
retrieve information about this page! Sorry for that!" );
    }
    END_CATCH_ALL
}
void CVaioAgentCtrl::AddLinksFromDocument(IHTMLDocument2
dIHTMLDocument2)
{
    IHTMLElementCollection    dIHTMLElementCollection;
    IHTMLElement    dIHTMLElement;
    IHTMLElementCollection    dChildIHTMLElementCollection;
    IHTMLElement    dChildIHTMLElement;
    IHTMLImgElement    dChildIHTMLImgElement;
    IHTMLAnchorElement    dIHTMLAnchorElement;
    VARIANT varName, varIndex;
    VariantInit(&varName);
    VariantInit(&varIndex);
    V_VT(&varName) = VT_ERROR;
    V_ERROR(&varName) = DISP_E_PARAMNOTFOUND;
    V_VT(&varIndex) = VT_I4;
    // for image tag inside of a link
    VARIANT varChildIndex;
    VariantInit(&varChildIndex);
    V_VT(&varChildIndex) = VT_I4;
    char szPictureNumber[20];
```

APPENDIX A-continued

```
    char szCommandName[INTERNET_MAX_URL_LENGTH];
    CString szVoice;
    CString szCaption;
    CString szTemp;
    CString szAltText;
    dIHTMLElementCollection = dIHTMLDocument2.GetLinks( );
    for(int i=0; i<dIHTMLElementCollection.GetLength( ); i++) {
        V_I4(&varIndex) = i;
        dIHTMLAnchorElement =
dIHTMLElementCollection.item(varIndex, varName);
                    dIHTMLElement =
dIHTMLElementCollection.item(varIndex, varName);
        sprintf(szCommandName, "2-N%d", iLinkNumber++);
        if (dIHTMLElement.GetInnerText( ) == " " ||
dIHTMLElement.GetInnerText( ) ==" ")
        {
            if(dIHTMLElement.GetTagName( ) == "A"){ // should be a image link
                dChildIHTMLElementCollection =
dIHTMLElement.GetChildren( );
                for(int j=0;
j<dChildIHTMLElementCollection.GetLength( ); j++) {
                    V_I4(&varChildIndex) = j;
                    dChildIHTMLElement =
dChildIHTMLElementCollection.item(varChildIndex,
varName);
                    if( dChildIHTMLElement.GetTagName( ) ==
"IMG" ) {
                        dChildIHTMLImgElement =
dChildIHTMLElementCollection.item(varChildIndex,
varName);
                        szCaption =
dChildIHTMLImgElement.GetAlt( );
                    }
                }
                if (szCaption== " " || szCaption == "   ")
                {
                    sprintf(szPictureNumber, " %d",
iImageLinkNumber);
                    szCaption = (CString) "picture" +
szPictureNumber;
                    iImageLinkNumber++;
                }
                szTemp = "<br>" + szCaption;
                dIHTMLElement.insertAdjacentHTML("BeforeEnd",
(LPCTSTR)szTemp);
            }
            else
                szCaption = "Area Link";
        } else {
            szCaption = dIHTMLElement.GetInnerText( );
        }
        if( szCaption != "Area Link") // will not add area links
            //AddCommand( szCommandName,
                    dIHTMLAnchorElement.GetHref( ), szCaption);
            AddInvisibleCommand( szCommandName,
dIHTMLAnchorElement.GetHref( ), szCaption);
    }
}
```

APPENDIX B

ACTIVEX™ TECHNOLOGY FOR INTERACTIVE SOFTWARE AGENTS

Abstract

5   Agent API is a set of programmable software services that supports the presentation of interactive animated characters within the Microsoft Windows® interface. Developers can use characters as interactive assistants to introduce, guide, entertain, or otherwise enhance their Web pages or applications in addition to the conventional use of windows, menus, and controls.

10  The Agent enables software developers and Web authors to incorporate a new form of user interaction, known as *conversational interfaces*, that leverages natural aspects of human social communication. In addition to mouse and keyboard input, Microsoft Agent includes optional support for speech recognition so applications can respond to voice commands. Characters can respond using synthesized speech, recorded audio, or text in a cartoon word balloon.

The conversational interface approach facilitated by the Agent services does not replace conventional graphical user interface (GUI) design. Instead, character interaction can be easily blended with the conventional interface components such as windows, menus, and controls to extend and enhance your application's interface.

15  Agent's programming interfaces make it easy to animate a character to respond to user input. Animated characters appear in their own window, providing maximum flexibility for where they can be displayed on the screen. Agent includes an ActiveX™ control that makes its services accessible to programming languages that support ActiveX, including Web scripting languages such as Visual Basic® Scripting Edition (VBScript). This means that character interaction can be programmed even from HTML pages using the <OBJECT> tag.

INTRODUCTION

20  The Agent API provides services that support the display and animation of animated characters. Implemented as an OLE Automation (Component Object Model [COM]) server, Agent enables multiple applications, called *clients* or *client applications*, to host and access its animation, input, and output services at the same time. A client can be any application that supports the Agent's COM interfaces.

25  Although you can call Agent's COM interfaces directly, Agent also includes an ActiveX™ control. This control makes it easy to access Agent's services from programming languages that support the ActiveX control interface. For information, see *Programming the Microsoft Agent Server Interface* and *Programming the Microsoft Agent Control*.

30  As a COM server, Agent starts up only when a client application requests to connect to it. It remains running until all clients close their connection. When no connected clients remain, Agent automatically exits. Agent also exits when a user explicitly chooses the Exit command on the pop-up menu of Agent's taskbar icon and confirms exiting in the warning message box. This action causes the server to send a Shutdown event to all connected clients advising them that the server is exiting.

LICENSING AND DISTRIBUTION

The Agent self-extracting executable installs a number of system files and registry entries. Web developers can include the CLSID in the <OBJECT> tag of their HTML page, subject to the provisions of the license agreement displayed when the control is downloaded and installed. Application developers who want to add Agent services and any of its components (including Agent character files) to their application must obtain a redistribution license for Agent. For more information on redistribution of Agent, see Microsoft Agent Licensing and Redistribution.

ANIMATION SERVICES

The Agent's animation services manage the animation and movement of a character's image in its own window on the screen. An animation is defined as a sequence of timed and optionally branched frames, composed of one or more images. Specifying the Play statement with the name of an animation plays that animation. Animation names are specific to a character definition. As an animation plays, the shape of its window changes to the match the image in the frame. This results in a movable graphic image, or *sprite*, displayed on top of the desktop and all windows.

Each client application can display and animate its own character. You can also share a character between multiple client applications. The Agent also supports clients using multiple characters displayed at the same time. The animation services enable you to animate characters independently or synchronize their animation.

To access a character, use the Load method to load the character's data. The Agent's services include a data provider that supports two formats for loading character and animation data: a single structured file and separate files. Typically, you would use the single file format (.ACS) when the data can be stored locally. The multiple file format (.ACF,.AAF) works best when you want to download animations individually, such as when accessing animations from a Web page script.

The Agent provides a set of characters you can download and use, subject to the provisions of the license agreement. For information on accessing the characters, see the Agent Characters page.

You can define your own character and its animations using any rendering tool you prefer. To compile a character's animations for use with Agent, use the Agent Character Editor. This tool enables you to define a character's default properties as well as define animations for the character. The Agent Character Editor also enables you to select the appropriate file format when you create a character. For alternative formats or rendering, you can supply your own animation data provider.

The animation services also play certain animations automatically. For example, when you call the MoveTo and GestureAt methods, the server determines what animation to play based on the character's current position. Similarly, the services play Idling animations when the user has not interacted with the character. These server-managed animations are called "states," and are defined when a character is created. For more information, see "Using the Agent Character Editor".

Client applications can directly hide or show a character by using the Hide or Show methods that play the animations assigned to the Hiding and Showing states and set the character's Visible property. This functionality enables you to display or hide a character using your own interface.

Although the server produces no output when a character is hidden, the server still queues and processes the animation request (plays the animation), but passes a request status back to the client. In the hidden state, the character cannot become input-active. However, if the user speaks the name of a hidden character (when speech input is enabled), the server automatically shows the character.

The Agent queues animation requests and processes them asynchronously. This enables your application's code to continue while character animations play. However, you can still monitor and manage your character's animation queue by creating an object reference to the request.

INPUT SERVICES

A client application provides the primary user interface for interaction with a character. You can program a character to respond to any form of input, from button-clicks to typed-in text. In addition, The Agent provides events so you can program what happens when the user clicks, double-clicks, or drags the character. The server passes the coordinates of the pointer and any modifier key state for these events.

Speech Input Support

In addition to supporting mouse and keyboard interaction, Agent includes support for speech input. You can use The Microsoft Command and Control Engine for supporting speech recognition. The Command and Control speech engine enables users to speak naturally without pausing between words. Speech recognition is speaker-independent, but it can be trained for improved performance. Because Agent's support for speech input is based on Microsoft SAPI (Speech Application Programming Interface), you can use Agent with other engines that are SAPI-compliant.

The user can initiate speech input by pressing and holding the push-to-talk listening hotkey. In this mode, if the speech engine receives the beginning of spoken input, it holds the audio channel open until it detects the end of the utterance. However, when not receiving input, it does not block audio output. This enables the user to issue multiple voice commands while holding down the key, and the character can respond when the user isn't speaking. If a character attempts to speak while the user is speaking, the character's audible output fails though text may still be displayed in its word balloon. If the character has the audio channel while listening key is pressed, the server automatically transfers control back to the user after processing the text in the Speak method. An optional MIDI tone is played to cue the user to begin speaking. This enables the user to provide input even if the application driving the character failed to provide logical pauses in its output.

Because multiple client applications can share the same character and because multiple clients can use different characters at the same time, the server designates one client as the *input-active* client and sends mouse and voice input only to that client application. This maintains the orderly management of user input, so that an appropriate client responds to the input. Typically, user interaction determines which client application becomes input-active. For example, if the user clicks a character, that character's client application becomes input-active. Similarly, if a user speaks the name of a character, it becomes input-active. Also, when the server processes a character's Show method, the client of that character becomes input-active. In addition, you can call the Activate method to make your client input-active, but you should do so only when your client application is active. For example, if the user clicks your application's window, activating your application, you can call the Activate method to receive and process mouse and speech input.

If multiple clients use the same character, the server defines the last one shown or the last one input-active as the current input-active character. However, you can also use the Activate method to set your client to become input-active or remain non-input-active when the user selects that character.

The Commands Window

When a speech engine is installed and enabled, Agent also includes a special interface called the Commands Window. This window displays the voice-enabled commands defined by the client applications for a character.

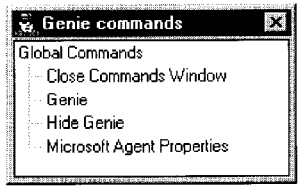

Figure 1. Commands Window

The Commands Window appears when the Open Commands Window command is chosen. Client commands appear in the Commands Window based on the Caption and Voice property settings of their Commands collection object.

The server creates a set of voice commands for general interaction and displays these under the Global Commands entry.

| Caption | Voice Grammar |
|---|---|
| Open \| Close Commands Window | ((open \| show) [the] commands [window] \| what can I say [now]) |
| | toggles with: |
| | close [the] commands [window] |
| *CharacterName* | [show] *CharacterName*\* |
| Hide All Characters | hide all [characters] |
| Hide *CharacterName* | hide *CharacterName*\*\* |
| Agent Properties \| Close Agent Property Sheet | [(open \| show)] [] agent (properties \| property sheet) |
| | toggles with: |
| | close [] agent (properties \| property sheet) |

\* All loaded characters are listed.
\*\* A character is listed here only if it is currently visible.

The server automatically displays the commands of the current input-active client and, if necessary, scrolls the window to display as many of the client's commands as possible, based on the size of the window. If the character has no client entries, the Global Commands entry is expanded. Non-input-active clients appear in the tree as single entries.

Speaking the voice command for a client's Commands collection switches to that client and the Commands Window displays the commands of that client. No other entries are expanded. Similarly, if the user switches characters, the Commands Window changes to display the commands of its input-active client. If the client is already input-active, speaking its voice command has no effect. (However, if the user collapses the active client's subtree with the mouse, speaking the client name redisplays the client's subtree.) If a client has voice commands, but no Voice setting for its Commands object (or no Caption), the tree displays "(command undefined)" as the parent entry, but only when that client is input-active and the client has commands in its collection that have Caption and Voice settings. The server includes voice commands in the Global Commands entry ([show] [me] global commands). If the user speaks "Global Commands," the Commands Window always displays its associated subtree entries. If they are already displayed, the command has no effect.

Although you can also display or hide the Commands Window from your application's code using the Visible property, you cannot change the Commands Window size or location. The server maintains the Commands Window's properties based on the user's interaction with the window. Its initial location is immediately adjacent to the Agent taskbar icon.

The Commands Window is included in the ALT+TAB window order. This enables a user to switch to the window to scroll, resize, or reposition the window with the keyboard.

The Listening Tip

When speech input is installed, Agent includes a special tooltip window that displays when the user presses the push-to-talk hot key. The following table summarizes the display of the Listening Tip when speech recognition is enabled.

| Action | Result |
|---|---|
| User presses the listening mode hot key | The Listening Tip appears below the active client's character and displays: <br> -- *CharacterName* is listening—for "*InputActiveClientCaption*" commands. <br> The first line identifying the character is centered. The second line is left justified and breaks to a third line when it exceeds the Listening Tip's maximum width. <br> If an input-active client of the character does not have a caption or defined voice parameters for its Commands object, the Listening Tip displays: <br> -- *CharacterName* is listening—for commands. <br> If there are no visible characters, the Listening Tip appears adjacent to the Agent taskbar icon and displays: <br> -- All characters are hidden -- <br> Say the name of a character to display it. <br> If the speech recognition is still initializing, the Listening Tip displays: <br> Say the name of a character to display it. <br> If the audio channel is busy, as when the character is audibly speaking or some other application is using the audio channel, the Listening Tip displays: <br> -- *CharacterName* is preparing to listen—Please wait to speak. |
| User presses the listening mode hot key and speaks a voice command | The Listening Tip appears below the active client's character and displays: <br> -- *CharacterName* heard—"*CommandText*" <br> The first line is centered. The second line is left justified and breaks to a third line when it exceeds the Listening Tip's maximum width. |

5   The Listening Tip automatically times out after being presented. If the "heard" text time-out completes when the user presses the hot key, the tip reverts to the "listening" text unless the server receives another matching utterance. In this case, the tip displays the new "heard" text and begins the time-out for that tip text. If the user releases the hot key and the server is displaying the "heard" text, the time-out continues. However,
10  although the server displays the "listening" text, it immediately removes the Listening Tip when the user releases the hot key.

The Listening Tip does not appear when the pointer is over the Agent taskbar icon. Instead, the standard notification tip window appears and displays "Press the *name of hot key* key to talk to *InputActiveCharacterName*" when the server is enabled. If all
15  characters are hidden, the tip displays, "Press the *name of hot key* key and say the name of a character." However, if the user presses the speaking hot key, the tip reflects the same text as the listening tip. For example, it displays, "*CharacterName* is listening for *InputActiveClientCaption* commands," or, "*CharacterName* is listening for commands," if the input-active client has not defined its Caption property; and
20  "*CharacterName* heard *CommandText*," when the speech engine processes a recognition. When the user disables speech input (or speech recognition is not installed), the icon's tooltip displays, " Agent is running." When the server is in its suspended state, the tip displays, " Agent is suspended."

Clients cannot write directly to the Listening Tip, but you can specify alternative
25  "heard" text that the server displays on recognition of a matching voice command. To do this, set the Confidence property and the new ConfidenceText property for the command. If spoken input matches the command, but the best match does not exceed the confidence setting, the server uses the text set in the ConfidenceText property in the tip window. If the client does not supply this value, the server displays the text (grammar) it matched.

Pop-up Menu Support

Agent includes a pop-up menu (also known as a contextual menu) for each character that the server displays automatically when a user right-clicks the character. This menu displays some standard commands managed by the server, but it also enables you to add and remove commands that your client application defines. The current input-active client's commands appear, provided that their Caption and Visible properties have been set. If the Enabled property has been set to True, the command appears enabled; if False, the command appears disabled (unavailable appearance). You define the access key for the entry by including an ampersand (&) before the text character of the Caption text setting. A separator appears before these commands. To create entries on a character's pop-up menu, define a Commands collection object and set the Caption and Visible properties of the commands. Note that menu entries do not change while the menu displays. If you add or remove commands or change their properties, the menu displays the changes when the user redisplays the menu.

The captions of any other clients (non-input-active) appear after another separator. To appear in the list, the Caption and Visible properties of their associated Commands object must be set. An ampersand in the text setting of the Caption property defines the access key for the entry. It is possible that access keys for menu items may be non-unique; however, this cannot be avoided. Separators appear only when there are items in the menu to separate. If no entries exist, the separator for that group does not appear.

Because the server provides the right-click pop-up menu as a standard service, avoid defining your own pop-up menu on the right-click event. However, if you define your own character, you can disable the server's pop-up menu by using the Agent Character Editor. This enables you to support your own interface for the right-click action for your character. However, the pop-up menu cannot be disabled by a client application.

When the user selects a command from a character's pop-up menu or the Commands Window, the server triggers the Command event of the associated client and passes back the parameters of the input using the UserInput object.

The server also provides a pop-up menu for the Agent taskbar icon. This menu provides the user access to all connected characters, and automatically assigns access keys for the characters based on the first letter of the character name. The menu also includes an entry that provides user access to the Agent property sheet. You cannot modify the contents of the Agent taskbar pop-up menu.

When the user chooses Exit from the Agent taskbar icon pop-up menu, the server notifies the user that applications (clients with existing connections to the server) may not operate correctly and requests confirmation. If the user confirms shutting down the server, the server sends all client applications a Shutdown event. Your application becomes responsible for how it handles this state. Client applications cannot stop or cancel server shutdown.

If the server gets a request to restart after being shut down, for example, because a new client connects, the server partially reloads in suspended state, displaying the "suspended" Agent icon in the taskbar notification area. Agent also displays a message box indicating that the current application has requested to restart its services and offers to restart the server. (It also includes an option for the user not to be prompted again.) If the user chooses to restart, the server restores in its full operation and sends clients the Restart event. If the user chooses not to restart, the server remains its suspended state until all its clients close their connections or the user explicitly chooses to exit it again.

The Agent Property Sheet

The Agent property sheet provides options for users to adjust their interaction with all characters. For example, users can disable speech input or change input parameters. Users can also change the output settings for the word balloon. These settings override any that is set by a client application or set as part of the character definition. Your application cannot change or disable these options, because they apply to the general user preferences for operation of all characters. However, your application can display or close the property sheet and access the location of its window.

OUTPUT SERVICES

Agent also supports audio output for the character. This includes spoken output and sound effects. For spoken output, the server lip-syncs the character's defined mouth images to the output. You can choose text-to-speech (TTS) synthesis, recorded audio, or only word balloon text output.

Synthesized Speech Support

If you use synthesized speech, your character has the ability to say almost anything, which provides the greatest flexibility. With recorded audio, you can give the character a specific or unique voice. To specify output, provide the spoken text as a parameter of the Speak method.

Because Agent's architecture uses Microsoft SAPI for synthesized speech output, you should be able to use any engine that conforms to this specification, and support International Phonetic Alphabet (IPA) output using the Visual method of the ITTSNotifySinkW interface. For further information on the SAPI interfaces, see the Microsoft Speech SDK.

Audio Output Support

Agent enables you to use audio files for a character's spoken output. You can record audio files and use the Speak method to play that data. Agent animation services automatically support lip-syncing the character mouth by using the audio characteristics of the audio file. Agent also supports a special format for audio files, which includes additional phoneme and word-break information for more enhanced lip-sync support. You can generate this special format using the Linguistic Information Sound Editing Tool (coming soon).

Word Balloon Support

Spoken output can also appear as textual output in the form of a cartoon word balloon. This can be used to supplement the spoken output of a character or as an alternative to audio output.

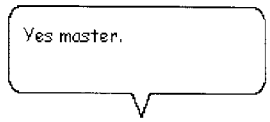

Figure 2. The Word Balloon

Word balloons support only captioned communication from the character, *not* user input. Therefore, the word balloon does not support input controls. If you want to provide user input for a character, supply those interfaces from your application or the other input services provided by Agent, such as the pop-up menu.

When you define a character, you can specify whether to include word balloon support. However, if you use a character that includes word balloon support, you cannot disable the support.

Animation Sound Effects

Agent also enables you to include sound effects as a part of a character's animation. Using the Agent Character Editor, you can specify the filename of standard Windows® sound (.WAV) files to trigger on a given frame. Note that Agent does not mix sound effects and spoken output, so spoken output does not begin until a sound effect completes. Therefore, avoid any long or looping sound effect as a part of a character's animation.

Attorney Docket No.: M-7062 US

2

SONY "VAIOMAN" CHARACTER

We have developed our own unique "Agent" for use with the desktop and laptop computers based on inputs from marketing. The animations currently available for our
5   Agent include:

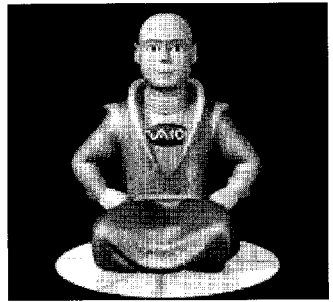

VAIOMan Animations

| Animation | Return Animation | Supports Speaking | Assigned to State | Description |
|---|---|---|---|---|
| 1. Acknowledge | None | No | None | Nods head |
| 2. Alert | AlertReturn | Yes | Listening | Straightens and raises eyebrows |
| 3. AlertReturn | None | No | None | Returns to neutral position |
| 4. Announce | AnnounceReturn | Yes | None | Takes out speakers |
| 5. AnnounceReturn | None | No | None | Returns to neutral position |
| 6. Blink | None | No | IdlingLevel1 | Blinks eyes |
| 7. Confused | ConfusedReturn | Yes | None | Scratches head |
| 8. ConfusedReturn | None | No | None | Returns to neutral position |
| 9. Congratulate | CongratulateReturn | Yes | None | Claps hands |
| 10. CongratulateReturn | None | No | None | Returns to neutral position |
| 11. Decline | DeclineReturn | Yes | None | Raises hands and shakes head |
| 12. DeclineReturn | None | No | None | Returns to neutral |

- 43 -

460637 v2
Client Reference: 50M2742

| | | | | position |
|---|---|---|---|---|
| 13. DontRecognize | DontRecognizeReturn | Yes | None | Holds hand to ear |
| 14. DontRecognizeReturn | None | No | None | Returns to neutral position |
| 15. Explain | ExplainReturn | Yes | None | Extends arms to side |
| 16. ExplainReturn | None | No | None | Returns to neutral position |
| 17. GestureDown | GestureDownReturn | Yes | GesturingDown | Gestures down |
| 18. GestureDownReturn | None | No | None | Returns to neutral position |
| 19. GestureLeft | GestureLeftReturn | Yes | GesturingLeft | Gestures left |
| 20. GestureLeftReturn | None | No | None | Returns to neutral position |
| 21. GestureRight | GestureRightReturn | Yes | GesturingRight | Gestures right |
| 22. GestureRightReturn | None | No | None | Returns to neutral position |
| 23. GestureUp | GestureUpReturn | Yes | GesturingUp | Gestures up |
| 24. GestureUpReturn | None | No | None | Returns to neutral position |
| 25. GetAttention | GetAttentionReturn | Yes | None | Waves arms |
| 26. GetAttentionReturn | None | No | None | Returns to neutral position |
| 27. GlanceDown | None | No | None | Looks down briefly |
| 28. GlanceLeft | None | No | None | Looks left briefly |
| 29. GlanceRight | None | No | None | Looks right briefly |
| 30. GlanceUp | None | No | None | Looks up briefly |
| 31. Greet | GreetReturn | Yes | None | Puts palms together |
| 32. GreetReturn | None | No | None | Returns to neutral position |
| 33. Hear_1 | None | No | Hearing | Right ear extends |
| 34. Hear_2 | None | No | Hearing | Left ear extends |
| 35. Hear_3 | None | No | Hearing | Both ears extend |
| 36. Hear_4 | None | No | Hearing | Turns head right |
| 37. Hide | None | No | Hiding | Disappears |
| 38. Idle1_1 | None | No | IdlingLevel1 | Takes breath |
| 39. Idle1_2 | None | No | IdlingLevel1 | Glances right and blinks |
| 40. Idle1_3 | None | No | IdlingLevel1 | Glance left and blinks |
| 41. Idle1_4 | None | No | IdlingLevel1 | Glances up to the right and blinks |
| 42. Idle1_5 | None | No | IdlingLevel1 | Glances down and blinks |

| | | | | |
|---|---|---|---|---|
| 43. Idle1_6 | None | No | IdlingLevel1 | Glances up and blinks |
| 44. Idle1_7 | None | No | IdlingLevel1 | Uses Walkman |
| 45. Idle1_8 | None | No | IdlingLevel1 | Uses Cellphone |
| 46. Idle1_9 | None | No | IdlingLevel1 | Uses Camcorder |
| 47. Idle2_1 | None | No | IdlingLevel2 | Turns a bit & blinks |
| 48. Idle2_2 | None | No | IdlingLevel2 | Reads |
| 49. Idle2_3 | None | No | IdlingLevel2 | Writes |
| 50. Idle3_1 | Idle3_1Return | No | IdlingLevel3 | Falls asleep |
| 51. Idle3_1Return | None | No | None | Returns to neutral position |
| 52. Idle3_2 | None | No | IdlingLevel3 | Yawns |
| 53. LookDown | None | No | None | Looks down |
| 54. LookDownBlink | None | No | None | Looks down and blinks |
| 55. LookDownReturn | None | No | None | Returns to neutral position |
| 56. LookLeft | None | No | None | Looks left |
| 57. LookLeftBlink | None | No | None | Looks left and blinks |
| 58. LookLeftReturn | None | No | None | Returns to neutral position |
| 59. LookRight | None | No | None | Looks right |
| 60. LookRightBlink | None | No | None | Looks right and blinks |
| 61. LookRightReturn | None | No | None | Returns to neutral position |
| 62. LookUp | None | No | None | Looks up |
| 63. LookUpBlink | None | No | None | Looks up and blinks |
| 64. LookUpReturn | None | No | None | Returns to neutral position |
| 65. MoveDown | MoveDownReturn | No | MovingDown | Flies down |
| 66. MoveDownReturn | None | No | None | Returns to neutral position |
| 67. MoveLeft | MoveLeftReturn | No | MovingLeft | Flies left |
| 68. MoveLeftReturn | None | No | None | Returns to neutral position |
| 69. MoveRight | MoveRightReturn | No | MovingRight | Flies right |
| 70. MoveRightReturn | None | No | None | Returns to neutral position |
| 71. MoveUp | MoveUpReturn | No | MovingUp | Flies up |
| 72. MoveUpReturn | None | No | None | Returns to neutral position |
| 73. Pleased | PleasedReturn | Yes | None | Leans forward and smiles |

| | | | | |
|---|---|---|---|---|
| 74. PleasedReturn | None | No | None | Returns to neutral position |
| 75. Processing | ProcessingReturn | No | None | Spins (*looping animation) |
| 76. ProcessingReturn | None | No | None | Returns to neutral position |
| 77. Read | None | Yes | None | Takes out laptop, reads and looks up |
| 78. ReadContinued | None | Yes | None | Looks down, reads, and looks up |
| 79. ReadReturn | None | No | None | Returns to neutral position |
| 80. Reading | ReadingReturn | No | None | Reads (*looping animation) |
| 81. ReadingReturn | None | No | None | Returns to neutral position |
| 82. RestPose | None | Yes | Speaking | Neutral position |
| 83. Sad | SadReturn | Yes | None | Sad expression |
| 84. SadReturn | None | No | None | Returns to neutral position |
| 85. Searching | SearchingReturn | No | None | Looks at spinning globe (*looping animation) |
| 86. SearchingReturn | None | No | None | Returns to neutral position |
| 87. Show | None | No | Showing | Appears in a puff of smoke |
| 88. StartListening | StartListeningReturn | Yes | None | Holds out microphone |
| 89. StartListeningReturn | None | No | None | Returns to neutral position |
| 90. StopListening | StopListeningReturn | Yes | None | Puts hands to ears |
| 91. StopListeningReturn | None | No | None | Returns to neutral position |
| 92. Suggest | SuggestReturn | Yes | None | Displays light bulb on laptop |
| 93. SuggestReturn | None | No | None | Returns to neutral position |
| 94. Surprised | SurprisedReturn | Yes | None | Looks surprised |
| 95. SurprisedReturn | None | No | None | Returns to neutral position |
| 96. Think | ThinkReturn | Yes | None | Looks up with hand on chin |
| 97. ThinkReturn | None | No | None | Returns to neutral position |
| 98. Uncertain | UncertainReturn | Yes | None | Shrugs |
| 99. UncertainReturn | None | No | None | Returns to neutral |

| | | | | position |
|---|---|---|---|---|
| 100. Wave | WaveReturn | Yes | None | Waves |
| 101. WaveReturn | None | No | None | Returns to neutral position |
| 102. Write | None | Yes | None | Takes out laptop, writes and looks up |
| 103. WriteContinued | None | Yes | None | Looks down, reads, and looks up |
| 104. WriteReturn | None | No | None | Returns to neutral position |
| 105. Writing | WritingReturn | No | None | Writes (*looping animation) |
| 106. WritingReturn | None | No | None | Returns to neutral position |

AGENT SCRIPT

The script for the Agent based VAIO Space II (VSII) tour is created in a plain text file in a specific format that the tour program understands. The tour drives the actions of the agent.

The file is broken down into sections and each section can have several subsections. A section start is determined by "[Section Name]" line. Every line from there until the next section starts belongs to the current section. A blank line separates each subsection from another. A blank line also separates the end of a section and the beginning of another.

The tour program looks for specific variables in each subsection/section. These are the actions of the agent as well as the page to currently navigate to on VAIO Space II. These variables are:

- NavigateToPage : *URL*
- MoveTo : *x, y*
- GestureAt : *x, y*
- LoopAnimation: *Animation name, duration* (in seconds)
- PlayAnimation : *Animation name*
- SpeakText : *Text to be spoken*
- SpeakWav : *Wav file or .lpv (linguistically modified) file to play*

*NavigateToPage* – This is the URL of the particular page to show on the VSII navigation section.

*MoveTo* – This is the location on the screen relative to VSII that the character moves to.

*GestureAt* – This is the location on the screen relative to VSII that the character gestures toward.

*LoopAnimation* – This is the special looping animations that the character plays for the specified duration. These animations are: Processing, Searching, Writing, etc. These animations require user intervention to stop and prevent the character from doing anything else while it's playing the animation. This is essentially why *duration* needs to be specified. The tour program stops the looping after the specified time has elapsed.

*PlayAnimation* – This is the animation the character plays. This animation is a standard animation and therefore requires no user intervention to stop it. If there is *SpeakText* given, the character speaks while processing this animation.

*SpeakText* – This is the text the character will speak. The text appears in the balloon of the character while it speaks. If a *SpeakWav* is given, this text is shown in the balloon while the character is playing the recorded file. In this case the character appears to be lip-synching.

*SpeakWav* – This is the Wav file or linguistically formatted file (.lpv) that the character will play. If *SpeakText* is provided then the *SpeakText* contents appear in the character's balloon while the recording is being played. If no *SpeakText* is provided the balloon is empty and invisible (.Wav files) or the text associated in the linguistically formatted file is used (.lpv files).

Sample Script

```
1)  [SOFTWARE CENTER]
2)  MoveTo: 160, 150
3)  LoopAnimation: Processing, 5
4)  GestureAt: 200, 300
5)  SpeakText: This is the software center of VAIO Space 2.0.
6)
7)  PlayAnimation: GestureLeft
8)  SpeakText: You store your software in here.
9)
10) MoveTo: 300, 40
11) PlayAnimation: GestureUp
12) SpeakWav: C:\wavfiles\softwarecenter.wav
13)
14) [New section name]
15)   :
16)   :
```

In this instance, the character moves to location 160, 150 on the screen, does a "Processing" animation for 5 seconds, gestures toward location 300, 40 on screen and says "*This is the software center of VAIO Space 2.0*" while still gesturing. Then it gestures left and says "*You store your software in here.*" while gesturing left. Finally, it moves to location 300, 40 on the screen, and while gesturing up plays "*softwarecenter.wav*" file and moves it's lips as the recording is playing (note: balloon is not visible here only).

VAIOMAN TOUR

The VAIO Space II (VSII) Tour program is designed to help the user take a tour of VSII. It is agent based to provide a user friendly UI and an alternative to a canned tour. It is also a way to introduce the Agent Technology into the system as well as speech enable VSII.

The actions of the agent character are based on a script, which is stored in a text file. When the program starts up, the character is created and a menu based on the different categories of VSII is provided for the characters speech enabled command system. The user would either, via speech or mouse, tell the program which category the tour should start from. The script for that category and subsequent categories are loaded as needed into the program and the character performs the specified actions.

The program communicates with the VSII scope by means of the registry and messages so that the scope handles navigation and synchronization for it.

```
1)   m_VaioProfiler.SetValueString("Page", NavPage, 255);
2)   m_bDoneNavigating = FALSE;
3)
4)   //Send scope to navigate that Page
5)   ::SendMessage(m_hVaioWnd, WM_NAVIGATE_PAGE, 0, (LPARAM)
       m_hWnd);
6)
```

During the tour, the program can be interrupted by either clicking on or double clicking on the character; or by hiding the character. When the tour is asked to continue, it can continue from where it stopped or it can start from the beginning. You can also quit the tour by choosing that command from the character's menu.

The commands for the character are pre-designated in the tour program and are expected as section names in the script file in the form of "[Section Name]". The "[" character designates the beginning of a section. Subsections are expected and should be differentiated by means of a blank line. See the "VSII Script Functional Document" for a more detailed description of the script file.

When a category is chosen from the character's menu (or recognized by the character as spoken text), the program uses the selected category name as section name and loads the script for that section and the character then performs the actions specified in the script.

A linked list of a program-defined structure is maintained and used to store the categories and the script related to that category, when needed. Below is the structure:

```
1)   typedef struct tagScript{
2)     int     moveTo[2];
3)     int     gestureAt[2];
4)     CString    playAnimation;
5)     CString    loopAnimation;
6)     int     loopAnimationPlayLength;
7)     CString    speakText;
8)     CString    speakWav;
9)     CString    navigatePage;
10)    struct tagScript *next;
11)  }SCRIPT, *LPSCRIPT;
12)
13)  typedef struct tagCategories{
14)    CString CategoryName;
15)    LPSCRIPT CategoryScript;
16)    struct tagCategories *next;
17)  }CATEGORIES, *LPCATEGORIES;
18)
```

The program accesses the script file for a particular category only once for the lifetime of the tour program.

Category:
- Category name;

- Category script list;

Category script:
- URL to navigate to
- Animation to play
- Loop animation to play
- How long to play loop animation - seconds
- Regular animation to play
- Text to be spoken
- Recorded file to be played while "speaking" (.lpv or .Wav)
- Location to move to
- Location to gesture toward Initial Character Menu:
- Introduction
- Start from Software Center
- Start from AV Center
- Start from Online Center
- Start from Tool Center
- Start from Help Center
- Start from Continue Tour
- Start from Restart Tour
- Quit Tour The order of the actions is as follows:

1. Navigate the specified URL
2. Move to the specified location – x, y
3. Play specified looping animation for specified length of time
4. Gesture toward a particular location – x, y
5. Play specified regular animation
6. Speak the specified text (while playing specified recorded text)
7. Play recorded file only, there may not be speech. This is same as 5.

NOTE: Other than looping animations, which forces user intervention to stop, hence the duration requirement, other animations and gestureats' are played while the character speaks.

When the tour program is interrupted, the character is put into an idling state or hidden. The user can restart the tour, go to the same or different category, or quit. While the character is in an idling state (or hidden), the user can continue working in VSII and return to the tour later.

At any time in the tour, if the VSII program is not shut down, the tour quits. If the VSII program is not running, the tour will not start. If a character is been created when the tour program is initiated, that character is temporarily hidden and shown when the tour ends.

When a the user issues a command to start the tour from any of the VSII categories, the tour is set on a timer and the synchronization between the navigation on VSII and the Agent script is set up. A new page cannot be navigated unless the script regarding the previous one has been finished. Below is the part of the code that handles that:

```
1)    BOOL found = FALSE;
2)    AgentStopAll();
3)
4)    BeginTour();
5)
6)    while(!found && m_pCurrentCategory)
7)    {
8)      if (m_pCurrentCategory->CategoryName == cmdName)
9)      {
10)      found = TRUE;
11)      break;
12)    }
13)    m_pCurrentCategory = m_pCurrentCategory->next;
14)    }
15)
16)    if(found)
17)    {
18)    BOOL scriptFound = FALSE;
19)    CString sectionName;
20)    if (cmdName == "Introduction")
21)    {
22)    sectionName = m_pCurrentCategory->CategoryName;
23)    if(m_pCurrentCategory->CategoryScript == NULL)
24)    {
25)    sectionName.MakeUpper();
26)    scriptFound = GetScript(CString("[" + sectionName + "]"));
27)    }
28)    if(scriptFound)
29)    {
30)    m_pScriptReader = m_pCurrentCategory->CategoryScript;
31)    ReadIntroduction();
32)    }
33)    }
34)    else
35)    {
36)    if(!m_bTimerSet)
37)    {
38)    m_bTimerSet = TRUE;
39)    SetTimer(TOUR_EVENT_ID, 2000, NULL);
40)    ReadNextScript();
41)    }
42)    }
43)    }
44)    else
45)    {
46)    CString csSpeak = CString("Could not find the selected section - ") + cmdName;
```

```
47)    AgentSpeak(csSpeak, "");
48)    }
49)
50)    if(!m_pCurrentCategory)
51)    TourOver();
52)
```

This part of the code resides within the timer handler function:

```
1)    if(nIDEvent == TOUR_EVENT_ID)
2)    {
3)    if(m_bScriptFinished && m_bDoneNavigating)
4)    {
5)    m_bScriptFinished = FALSE;
6)    if(m_pCurrentCategory)
7)    {
8)    ContinueTour();
9)    m_pCurrentCategory = m_pCurrentCategory->next;
10)   }
11)   }
12)   else
13)
14)   if(m_bDoneNavigating && m_bSpeechEnded) ReadNextScript();
```

AGENT NAVIGATION FOR VAIOSPACE & WEB

Overview

In an effort to promote the "Easy & Enjoyable PC" message, we have implemented a method of using the agent for VAIO Space II (VSII) and web navigation. Thus the Agent navigation program allows the user to voice enable the navigation browser as well as provide a read back feature for sightless surfing of the web.

WEB NAVIGATION USING VOICE

The implementation of VSII is such that the Agent can now be used for navigation. VSII has an options page that indicated whether the user would like to voice navigate the program upon startup. The user can also start voice navigation whenever by means of a button click on the VSII Launch Pad.

When the Agent first appears on the screen, he will give the user a brief introduction and display it's speech enabled menu. An initial menu of the different categories in VSII is used to create an initial menu for the Agent. These categories are indicated in the Launch-Pad section of VSII.

The Agents menu commands are accessible by mouse or by voice. When the user chooses a category to navigate to, that particular category tree is opened and the first page within that category is also opened in the navigation section of VSII. This prompts the Agent that a new page is open and that page is parsed and menu commands are added to its initial menu commands based on the links and pictures within this new page.

Whenever a new page is navigated to, the previous menu sans VSII categories are dropped and new menu commands added based on pictures and web links within this new page. The pictures are dynamically modified by adding a little nametag to indicate to the user that pictures can also be navigated to. This is accomplished by showing the picture's alternative name (ALT), if one exists, or by specifying Picture0, Picture1, etc., if no ALT names exists.

In addition to the VSII categories, which are used to create global commands, there are also some standard browser commands that the Agent understands which are also included in its VSII global commands. While on the web, these are the commands that are used for surfing.

Universal Browser Navigation Commands:
- Go Back – Goes back to the last page (same as clicking the back button on the toolbar)
- Go Forward – Goes to the next page (same as clicking the forward button on the toolbar)
- Stop – Stops the browser from completing the task (same as clicking the stop button)
- Scroll Up – Same as Page up
- Scroll Down – Continuously scroll down page
- Scroll Left – Same as Page Left
- Scroll Right – Same as Page Right Page Navigation Commands:
- Open/Go to {Link/Picture}: Saying "Open/Go to *linkname*" (*linkname* could be any link on HTML pages, includes dynamically modified pictures as well.) This is the same as clicking on *linkname*.
- Go to Favorites: Goes to c:\window\favorites directory. The Agent will use the folder contents to build a new menu so that the user an also voice navigate contents of the favorites folder. It can drill down to a file and execute that file.
- Read Page: Starts reading the text on the current page. Pauses after reading a paragraph or when the user hits the Scroll Lock key on the keyboard and asks if he should continue or stop.
- Read Selection: Starts reading the selected text within the current page. If no text is selected, the Agent will ask the user to make selection first.

VSII Navigation Commands:
This menu is dynamically built based on the information provided in the Launch Pad. It could shrink and grow without affecting the Agent navigation program. These are the current categories in VSII.

- Software Center
  - Applications
  - Accessories
- Audio/Video Center
  - Video
  - Audio
  - DVD Attorney Docket No.: M-7062 US

- Online Center
  - Easy Internet
  - VAIO Direct
  - Club VAIO
  - Image Station
  - Internet
- VAIO Center
  - Desktop
  - Web Links
- Tool Center
  - Tools
  - Options
- Help Center Other VSII Navigation Commands:
- VAIOMan Animations
- VAIOMan Help
- VAIOMan Options
- Exit VAIOMan

ENABLING TECHNOLOGY

TECHNOLOGY: ActiveX control

Microsoft Agent

Internet explorer object modal

Speech Recognition

Text-to-speech Synthesis Engine

Sony developed VAIO Scope and messaging control

TECHNICAL / ARCHITECTURE
Overview

The VSII Agent navigation program is outlined inside the Agent (VAIOMan) Control, which is then embedded into the VSII program. A simple function call starts the Agent. VSII also contains the messaging control, which allows communication between the Agent control and VSII.

When the Agent is initiated, the control, in addition to doing Agent specific functions, also links to the embedded browser navigation window so that it can parse the loaded pages for menu creations and read back capability as well as communication capability between the navigation page and the Agent control. When the browser fires its "Navigation Complete" event, the program (Agent control) then begins to parse the page. The program is also able to inform the browser to navigate a certain URL.

This is part of the code that executes when the agent is initiated:

```
1)
2)    :
3)    :
4)    GetOptionsFromRegistry();
5)    m_pCWebBrowser2 = (CWebBrowser2 *)pCWebBrowser2;
6)    m_pCWebBrowser2Nag = (CWebBrowser2 *)pCWebBrowser2Nag;
7)    m_pCScopeDlg = (CDialog *)pCScopeDlg;
8)
9)    m_pCAgentCtl = new CAgentCtl();
10)   ASSERT (m_pCAgentCtl);
11)   m_pCAgentCtl->Create(NULL, WS_VISIBLE, CRect(), (CWnd
      *)this, ID_AGENT_CONTROL);
12)   m_pIAgentCtlCharacters = new IAgentCtlCharacters(
      m_pCAgentCtl->GetCharacters() );
13)   m_varBstr.bstrVal =
      GetCurrentCharacter().AllocSysString();
14)   m_pIAgentCtlCharacters->Load( (const char *)&lAgentID,
      m_varBstr);
15)   m_pICharacterAgent = new IAgentCtlCharacter(
      m_pIAgentCtlCharacters->GetItem((const char *)&lAgentID) );
16)
17)   keybd_event( GetAgentHotKey(), 0x45, KEYEVENTF_EXTENDEDKEY
      | 0, 0 );
18)   keybd_event( GetAgentHotKey(), 0x45, KEYEVENTF_EXTENDEDKEY
      | KEYEVENTF_KEYUP, 0);
19)
20)   m_pIAgentCommands =  new IAgentCtlCommands(
      m_pICharacterAgent->GetCommands() );
21)   m_pIAgentCommands->SetCaption( "Vaio Guide Commands" );
22)   m_pIAgentCommands->SetVoice( "Vaio Guide Commands" );
23)   m_pIAgentCommands->SetVisible(TRUE);
24)   m_pIAgentCtlCommandsWindow = new IAgentCtlCommandsWindow(
      m_pCAgentCtl->GetCommandsWindow() );
25)
26)
```

- 57 -

```
27)   // create event sink
28)   m_pBrowserSink = new CBrowserSink;
29)   ASSERT (m_pBrowserSink);
30)   m_pBrowserSink->m_pParent = this;
31)   LPUNKNOWN pUnkSink = m_pBrowserSink-
      >GetControllingUnknown();
32)   ASSERT (pUnkSink);
33)   IUnknown *   pUnkSrc;
34)   pUnkSrc = m_pCWebBrowser2->GetControlUnknown( );
35)   // hook up sink with connection point
36)   VERIFY (AfxConnectionAdvise(pUnkSrc, IID_IBrowserSink,
      pUnkSink, FALSE, &m_dwCookie));
37)
38)   GetVaioSpaceCommands();
39)   if(m_bShowCommandWnd){
40)   m_bShowCommandWnd = FALSE;
41)   UpdatePage();
42)   m_bShowCommandWnd = TRUE;
43)   } else
44)   UpdatePage();
45)   RECT rect;
46)   m_pCWebBrowser2Nag->GetWindowRect(&rect);
47)   MoveAgentTo(rect.left-30, rect.bottom-100);
48)   m_pICharacterAgent->Show(m_varFalse);
49)   AgentIntroduction();
50)   :
51)   :
52)
53)
```

In lines 8 – 14, the Agent is created and default character (VAIOMan) loaded. Lines 16 – 17 allow the Agent menu to be shown by simulating a keyboard key press. Lines 18 – 22 creates, initialized and loads the Agent commands window. Lines 23 – 32 create the eventsink for browser so that the Agent will know when the browser fires an event. Line 33 – 39 add default commands from the navigation window and parses whatever loaded page is there. Lines 40 – 46 moves the Agent to its default location, makes the Agent visible and executes the AgentIntroduction function.

Below is a part of the code that handles the menu update, which is triggered when a page has been completely loaded into the navigation window:

```
1)    IShellFolderViewDual pShView( m_pCWebBrowser2-
      >GetDocument() );
2)    Folder pFolder(pShView.GetFolder());
3)    FolderItems pFolderItems(pFolder.Items());
4)    FolderItem pFolderItem;
5)
6)    VARIANT varIndex;
7)    VariantInit(&varIndex);
8)    V_VT(&varIndex) = VT_I4;
9)    VARIANT varVerb;
10)   VariantInit(&varVerb);
11)   char szCommandName[INTERNET_MAX_URL_LENGTH];
12)
13)   for(int i=0; i<pFolderItems.GetCount(); i++){
```

```
14)     V_I4(&varIndex) = i;
15)     pFolderItem = FolderItem(pFolderItems.Item(varIndex) );
16)     sprintf(szCommandName, "2-I%d", i);
17)     AddInvisibleCommand( szCommandName,
           pFolderItem.GetName(), pFolderItem.GetName());
```

When a *Scroll Down* command is issued, a scroll timer is set for each 500ms to move down the web page by 20 pixels until bottom of the page is reached or stop scrolling command is issued. Below is part of the code that handles that:

```
1)   void WebPageScrollDown()
2)   {
3)     IHTMLDocument2 dIHTMLDocument2( m_pCWebBrowser2-
       >GetDocument() );
4)     IHTMLWindow2 dIHTMLWindow2 =
       dIHTMLDocument2.GetParentWindow();
5)     IHTMLTextContainer dIHTMLTextContainer =
       dIHTMLDocument2.GetBody();
6)     IHTMLControlElement dIHTMLControlElement =
       dIHTMLDocument2.GetBody();
7)
8)     if( dIHTMLTextContainer.GetScrollTop() !=
       dIHTMLTextContainer.GetScrollHeight()-20 ){
9)       dIHTMLWindow2.scroll(dIHTMLTextContainer.GetScrollLeft(),
       dIHTMLTextContainer.GetScrollTop()+20 );
10)      SetTimer (ID_SCROLL_TIMER, 500, NULL);
11)      gbScrollTimerOn = TRUE;
12)
13)      AddCommand("2-Y", "Stop scrolling", L"Stop scrolling",
       L"Stop [scrolling]" );
14)
```

When a *Read Selection* command is issued, the Agent starts reading the selected area. If no area is selected, the Agent tells the user to select some text bfore issuing that command. Below is part of the code that handles that:

```
1)   void ReadSelection()
2)   {
3)     IHTMLDocument2 dIHTMLDocument2;
4)     IHTMLSelectionObject dIHTMLSelectionObject;
5)     IHTMLTxtRange   dIHTMLTxtRange;
6)     CString szSelectedText;
7)     IHTMLFramesCollection2 dIHTMLFramesCollection2;
8)
9)     dIHTMLDocument2 = m_pCWebBrowser2->GetDocument();
10)    dIHTMLFramesCollection2 = dIHTMLDocument2.GetFrames();
11)    if(dIHTMLFramesCollection2.GetLength() > 0){
12)      IHTMLWindow2 dIHTMLWindow2;
13)      IHTMLTxtRange      dIHTMLTxtRange;
14)      VARIANT varT;
15)      VariantInit(&varT);
16)      VARIANT varIndex;
17)      VariantInit(&varIndex);
18)      V_VT(&varIndex) = VT_I4;
19)
```

```
20)    for(int i=0; i<dIHTMLFramesCollection2.GetLength();
       i++){
21)        V_I4(&varIndex) = i;
22)        varT= dIHTMLFramesCollection2.item(&varIndex);
23)        dIHTMLWindow2 = varT.pdispVal;
24)        dIHTMLDocument2 = dIHTMLWindow2.GetDocument();
25)        dIHTMLSelectionObject =
   dIHTMLDocument2.GetSelection();
26)        dIHTMLTxtRange = dIHTMLSelectionObject.createRange();
27)        szSelectedText += dIHTMLTxtRange.GetText();
28)    }
29)    else {
30)        dIHTMLSelectionObject = dIHTMLDocument2.GetSelection();
31)        dIHTMLTxtRange = dIHTMLSelectionObject.createRange();
32)        szSelectedText = dIHTMLTxtRange.GetText();
33)    }
34)
35)    if(szSelectedText.IsEmpty())
36)        szSelectedText="Please use mouse to mark your selection
       first!";
37)    m_pICharacterAgent->Speak( (char *)LPCTSTR(szSelectedText)
       );
```

After each page is loaded and a new list of command is added. The Agent will automatically listen for commands for a few seconds. Below is the code that handles that:

```
1)   if(m_bAutoListen){
2)       keybd_event( GetAgentHotKey(), 0x45,
     KEYEVENTF_EXTENDEDKEY | 0, 0 );
3)       SetTimer (ID_LISTEN_TIMER, 5000, NULL);
4)   }
5)
6)   OnTimer function
7)   void OnTimer((UINT nIDEvent)
8)   {
9)   if (nIDEvent == ID_LISTEN_TIMER)
10)  {
11)      keybd_event( GetAgentHotKey(), 0x45,
     KEYEVENTF_EXTENDEDKEY | KEYEVENTF_KEYUP, 0);
12)      StopListenTimer();
13)  }
14)
15)  COleControl::OnTimer(nIDEvent);
16)  }
17)
```

In addition to the Agent automatically listening to commands, after a new set of commands have been loaded, it can also automatically show the commands window. Below is part of the code that enables that functionality.

```
1)   if(m_bShowCommandWnd){
2)       POINT oldCursorPoint;
3)       GetCursorPos(&oldCursorPoint);
4)
```

```
5)    SetCursorPos( m_pICharacterAgent->GetLeft() +
      m_pICharacterAgent->GetWidth()/2, m_pICharacterAgent-
      >GetTop() + m_pICharacterAgent->GetHeight()/2 );
6)    mouse_event( MOUSEEVENTF_RIGHTDOWN, 0, 0, WHEEL_DELTA, 0);
7)    mouse_event( MOUSEEVENTF_RIGHTUP, 0, 0, WHEEL_DELTA, 0);
8)    SetCursorPos( oldCursorPoint.x, oldCursorPoint.y);
9)    }
```

We claim:

1. A method of processing a document with a computer system, the method comprising:

the computer system reading a code for a non-textual visual feature in the document; and the computer system generating a signal informing a user of the non-textual visual feature, said signal comprising an audio signal and a textual tag created in response to said code;

wherein the non-textual visual feature is associated with one or more hyperlinks and said signal informs the user that the non-textual visual feature is associated with said hyperlinks.

2. The method of claim 1 wherein generating said signal comprises the computer system speaking all or part of said document while scrolling said document in synchronization with said speaking.

3. The method of claim 2 wherein said scrolling has a variable speed selected by the user.

4. A computer system comprising computer instructions for:

reading a code for a non-textual visual feature in a document; and generating a signal informing a user of the non-textual visual feature, said signal comprising an audio signal and a textual tag created in response to said code;

wherein the non-textual visual feature is associated with one or more hyperlinks and said signal informs the user that the non-textual visual feature is associated with said hyperlinks.

5. The computer system of claim 4 wherein generating said signal comprises the computer system speaking all or part of said document while scrolling said document in synchronization with said speaking.

6. The computer system of claim 5 wherein said scrolling has a variable speed selected by the user.

7. The computer system of claim 4 wherein said computer instructions are created by:

a computer system reading a computer program written in a scripting language, said scripting language including a plurality of operations which do not specify for each operation how the operation is to be implemented by the computer system, said operations each comprising an operator having, optionally, one or more operands;

executing said computer program, wherein said executing comprises:

parsing each line of said computer program written in said scripting language into one of said plurality of operations, decomposing each of said operations into said operator and said optional operand or operands, performing the function of said operator using said operand or operands, when present, by translating said scripting languagre operation into one or more program instructions recognizable by said computer system that together implement said operation; and displaying the results of said performance to a user;

wherein said computer system comprises computer instructions for providing an agent-based user interface.

8. The computer system of claim 7, wherein said scripting language further comprises a plurality of category types each identified by a unique category name, wherein said category name denotes a group of said operations, and wherein reading said group is accomplished in response to a user input to said computer system.

9. The computer system of claim 7, wherein said scripting language further comprises pairs of said operators and said optional operands written as one pair per line of said computer program.

10. The computer system of claim 7, wherein said scripting language further comprises pairs of said operators and said optional operands written as a plurality of pairs per line of said computer program each separated by a delimiter symbol, said delimiter symbol comprising one or more characters.

11. The computer system of claim 7 wherein said computer system comprises at least computer instructions for executing an agent-driven application.

12. A computer readable storage medium comprising computer instructions for:

reading a code for a non-textual visual feature in a document; and the computer system generating a signal informing a user of the non-textual visual feature, said signal comprising an audio signal and a textual tag created in response to said code;

wherein the non-textual visual feature is associated with one or more hyperlinks and said signal informs the user that the non-textual visual feature is associated with said hyperlinks.

13. The computer readable storage medium of claim 12 wherein generating said signal comprises the computer system speaking all or part of said document while scrolling said document in synchronization with said speaking.

14. The computer readable storage medium of claim 13 wherein said scrolling has a variable speed selected by the user.

15. The computer readable storage medium of claim 12 wherein said computer instructions are created by:

a computer system reading a computer program written in a scripting language, said scripting language including a plurality of operations which do not specify for each operation how the operation is to be implemented by the computer system, said operations each comprising an operator having, optionally, one or more operands; and said computer system generating one or more instructions that together perform said operations;

wherein said computer system comprises computer instructions for providing an agent based interface.

16. The computer readable storage medium of claim 15, wherein said scripting language further comprises a plurality of category types each identified by a unique category name, wherein said category name denotes a group of said operations, and wherein reading said group is accomplished in response to a user input to said computer system.

17. The computer readable storage medium of claim 15, wherein said scripting language further comprises pairs of said operators and said optional operands written as one pair per line of said computer program.

18. The computer readable storage medium of claim 15, wherein said scripting language further comprises pairs of said operators and said optional operands written as a plurality of pairs per line of said computer program each separated by a delimiter symbol, said delimiter symbol comprising one or more characters.

19. The computer readable storage medium of claim 15 wherein said computer system comprises at least computer instructions for executing an agent-driven application.

20. A computer data signal embodied in a carrier wave, the computer data signal comprising computer instructions for:

reading a code for a non-textual visual feature in a document; and the computer system generating a signal informing a user of the non-textual visual feature, said signal comprising an audio signal and a textual tag created in response to said code;

wherein the non-textual visual feature is associated with one or more hyperlinks and said signal informs the user that the non-textual visual feature is associated with said hyperlinks.

21. The computer data signal of claim 20 wherein generating said signal comprises the computer system speaking all or part of said document while scrolling said document in synchronization with said speaking.

22. The computer data signal of claim 21 wherein said scrolling has a variable speed selected by the user.

23. The computer data signal of claim 20 wherein said computer instructions are created by:

a computer system reading a computer program written in a scripting language, said scripting language including a plurality of operations which do not specify for each operation how the operation is to be implemented by the computer system, said operations each comprising an operator having, optionally, one or more operands; and said computer system generating one or more instructions that together perform said operations;

wherein said computer system comprises computer instructions for providing an agent based interface.

24. The computer data signal of claim 23, wherein said scripting language further comprises a plurality of category types each identified by a unique category name, wherein said category name denotes a group of said operations, and wherein reading said group is accomplished in response to a user input to said computer system.

25. The computer data signal of claim 23, wherein said scripting language further comprises pairs of said operators and said optional operands written as one pair per line of said computer program.

26. The computer data signal of claim 23, wherein said scripting language further comprises pairs of said operators and said optional operands written as a plurality of pairs per line of said computer program each separated by a delimiter symbol, said delimiter symbol comprising one or more characters.

27. The computer data signal of claim 23 wherein said computer system comprises at least computer instructions for executing an agent-driven application.

\* \* \* \* \*